(12) United States Patent
Fiegener et al.

(10) Patent No.: US 8,545,335 B2
(45) Date of Patent: Oct. 1, 2013

(54) TOY WITH MEMORY AND USB PORTS

(75) Inventors: John D. Fiegener, Marblehead, MA (US); Michael David Tinstman, Revere, MA (US); Daniel Richard Armstrong, Marblehead, MA (US); William Paul Liteplo, Cambridge, MA (US); Chris Lohring, Salem, MA (US)

(73) Assignee: Tool, Inc., Marblehead, MA (US)

( * ) Notice: Subject to any disclaimer, the term of this patent is extended or adjusted under 35 U.S.C. 154(b) by 1416 days.

(21) Appl. No.: 12/210,308

(22) Filed: Sep. 15, 2008

(65) Prior Publication Data

US 2009/0137323 A1      May 28, 2009

Related U.S. Application Data

(60) Provisional application No. 60/972,635, filed on Sep. 14, 2007.

(51) Int. Cl.
*A63F 9/24* (2006.01)
(52) U.S. Cl.
USPC ............... 463/43; 463/40; 463/42; 446/175; 446/484
(58) Field of Classification Search
USPC ...... 463/40–45; 446/175, 484; 710/312–313
See application file for complete search history.

(56) References Cited

U.S. PATENT DOCUMENTS

| | | | |
|---|---|---|---|
| 5,746,602 A | 5/1998 | Kikinis | |
| 6,773,344 B1 | 8/2004 | Gabai | |
| 7,061,200 B2 | 6/2006 | Iribe | |
| 7,089,083 B2 | 8/2006 | Yokoo | |
| 7,219,064 B2 | 5/2007 | Nakakita | |
| 7,568,964 B2 * | 8/2009 | Ganz | 446/175 |
| 7,945,547 B2 * | 5/2011 | Terashima et al. | 707/705 |
| 8,023,253 B1 * | 9/2011 | Arboleda | 361/679.02 |
| 8,033,901 B2 * | 10/2011 | Wood | 463/1 |
| 2002/0061702 A1 | 5/2002 | Dan | |
| 2003/0003839 A1 | 1/2003 | Lin | |

(Continued)

FOREIGN PATENT DOCUMENTS

| | | | |
|---|---|---|---|
| GB | 2434228 A | * | 7/2007 |
| GB | 2470409 A | * | 11/2010 |

OTHER PUBLICATIONS

GB 2,434,228 A, Thomas Steven Hulbert, Pub. date Jul. 18, 2007, 38 pages.*
GB 2,470,409 A, Couchman et al., Pub. date Nov. 24, 2010.*

*Primary Examiner* — Dmitry Suhol
*Assistant Examiner* — Alex F. R. P. Rada, II
(74) *Attorney, Agent, or Firm* — Sand & Sebolt

(57) ABSTRACT

A system and method for a toy with memory (flash memory) storage capabilities and a method for the toy to connect to other like toys and to a computer and he internet for online virtual play and simulation. Connection to a computer system allows the user the ability connect to the internet and register the toy allowing the user access to interact with a virtual activities and scenarios including a virtual computer image and animation of the toy connected to a computer which is connected to the Internet. User may also purchase or win a USB (Universal Serial Bus) node or dongle with codes that attach to the USB connection on the toy to allow access to special rooms and events in the virtual world on the website. The status of the game is saved back to the memory storage in the toy.

25 Claims, 24 Drawing Sheets

(56) References Cited

U.S. PATENT DOCUMENTS

| | | |
|---|---|---|
| 2003/0124954 A1 | 7/2003 | Liu |
| 2003/0191560 A1 | 10/2003 | Yokoo |
| 2005/0157668 A1* | 7/2005 | Sivan ............................ 370/312 |
| 2006/0100018 A1 | 5/2006 | Ganz |
| 2006/0273909 A1 | 12/2006 | Heiman |
| 2007/0015435 A1 | 1/2007 | Goudie |
| 2007/0072511 A1 | 3/2007 | Zernovizky |
| 2007/0128978 A1* | 6/2007 | Nishino et al. ................ 446/484 |
| 2007/0159779 A1 | 7/2007 | Chang |
| 2007/0198694 A1* | 8/2007 | Nishino et al. ................ 709/224 |
| 2008/0172498 A1* | 7/2008 | Boucard .......................... 710/16 |
| 2008/0172545 A1* | 7/2008 | Boucard ....................... 711/221 |
| 2009/0029768 A1* | 1/2009 | Ganz ............................. 463/29 |

* cited by examiner

TOY WITH MEMORY AND USB PORTS

RELATED APPLICATIONS

This is a non-provisional utility application based on and claiming the priority of Provisional Patent Application 60/972635 with a filing date of Sep. 14, 2007.

The current invention is a system and method for a toy with memory (flash memory) storage capabilities and more particularly a toy that connects to other like toys and to a computer and to the internet for online virtual play and simulation. Since the toy is a mass storage device (static memory) the toy can be used when only connected to a computer and where not internet connection is present as well as connecting to specified internet location for virtual activities.

BACKGROUND OF THE INVENTION

Toys have been around for thousands of years. Many of these toys have been dolls or figurines. Over the course of time these dolls and figurine have been modified to keep up with the technology and needs of the children and adults of the time.

PRIOR ART

U.S. Pat. No. 7,089,083 by Yokoo, et al. and issued on Aug. 8, 2006 is for an electronic pet system, network system, robot, and storage medium. It discloses a virtual electronic pet and a pet-type robot that changes emotional state and instinct state according to surrounding information and internal information. The electronic pet behaves according to the emotional state and the instinct state. Transmission/reception of the internal state of the electronic pet (pet characteristic information) is made possible among the virtual electronic pet, the pet-type robot, and a personal computer. Thus, the action of the electronic pet is implemented by each device in accordance with the internal state of the Electronic pet affected by other equipment.

U.S. Pat. No. 7,061,200 by Iribe and issued on Jun. 13, 2006 is for a legged mobile robot and actuator device applicable to join shaft of the robot. It discloses where in order to suitably intercommunicate an output signal from a sensor arranged outside an actuator with a higher-order control system, an output from a contact sensor at an arbitrary position on a robot is entered to a nearest actuator device in that a wiring route is the shortest (or joint driving is not interfered therewith). Then, in the actuator device, the output of the outside sensor is processed to remove noise and sensor information is computed, and the processed results are bus-transmitted to the higher-order control system together with a drive-control signal of the actuator and sensor information from sensors housed in the actuator.

U.S. Pat. No. 6,773,344 by Gabai, et al. and issued on Aug. 10, 2004 is for methods and apparatus for integration of interactive toys with interactive television and cellular communication systems. Interactive toys have real time conversations with users, preferably employing speech recognition. Interactive toys are preferably connected to at least one interactive toy server which is preferably connected to entertainment, education, sales promotion and other content providers possibly via Internet communication systems. Such a connection may utilize, for example, telephone lines, cellular communication systems, coaxial cables, satellite, DSL or other broadband systems. Interactive toys may be connected, via a wireless link, to a computing device such as a home computer, an Interactive Television set-top box or a base unit which provides Internet connectivity for the toy. Interactive toys may support mobile cellular or satellite communication. These toys are able to provide entertainment, education, sales promotion and other content to a user.

U.S. Pat. No. 5,746,602 by Kikinis and issued on May 5, 1998 if for a PC peripheral interactive doll. It discloses an interactive system for teaching, entertaining, and habituating a child utilizes an interactive entity such as a doll, the doll having a microphone, a speaker, and control circuitry adapted for driving the speaker and microphone and a bidirectional communication link to a personal computer (PC). Scripted data stored at the computer directs doll activity and verbal articulation, and utilizes response from the child through the doll to the PC in directing output to the doll. In alternative embodiments the interactive doll has also servo-mechanisms for providing doll motion, such as eye and mouth and limb movement, which may be coordinated with verbalization in different scripts by commands retrieved at the computer and sent to the doll.

U.S. Pat. No. 7,219,064 by Nakakita, et al. and issued on May 15, 2007 is for a legged robot, legged robot behavior control method, and storage medium. It discloses a robot which autonomously forms and performs an action plan in response to external factors without direct command input from an operator. When reading a story printed in a book or other print media or recorded in recording media or when reading a story downloaded through a network, the robot does not simply read every single word as it is written. Instead, the robot uses external factors, such as a change of time, a change of season, or a change in a user's mood, and dynamically alters the story as long as the changed contents are substantially the same as the original contents. As a result, the robot can read aloud the story whose contents would differ every time the story is read.

United States Patent Application 20070159779 by Chang and published on Jul. 12, 2007 is for a figurine computer enclosure. It discloses a desktop computer has an enclosure with a three-dimensional figurine shape that bear resemblance of any man-made object or natural object, imaginary character or real character, include an animal, an imaginary animal, a cartoon/anime character, a robot. The figurine enclosure also can have movable and interchangeable parts that resemble a body part of the figurine, for example, a head, an arm, a leg, a facial feature, and a tail.

United States Patent Application 20070128978 by Nishino, et al. and published on Jun. 7, 2007 is for a Toy, data transmission method, and data transmission system. It discloses a toy that stores identification data and communication start data, and has an external connecting unit, the personal computer reads the identification data and the communication start data when the toy is connected with a personal computer, the identification data is automatically transmitted to a server through a network on the basis of the communication start data, the server determines whether the transmitted identification data is registered or not, the server transmits contents data to the personal computer when the identification data is registered, and the server transmits registration application data to the personal computer when the identification data is not registered.

United States Patent Application 20070072511 by Zernovizky, et al. and published on Mar. 29, 2007 is for an USB desktop toy. It discloses a desktop toy, and methods of its use. The toy, in the shape of a realistic or imaginary creature, is connected to a local computer via a communication port, and is actuated by a local or remote user to move so as to directly express gestures visually in three dimensions. The remote user sends gesture instructions to actuate the toy via a telecommunication mechanism from a remote computer. The remote user can program the gesture instructions via a graphical user interface. Optionally, the toy includes a speaker and/or a UFD.

United States Patent Application 20070015435 by Goudie and published on Jan. 18, 2007 is for a tongue toy system. It discloses an interactive online tongue toy system connected to one or many other toys or software over a global communication network specifically used for tongue motions or licking. The tongue toy system communicates directly to another tongue toy or group of tongue toys either using another tongue toy, or other toys to generate the control signals, or using software to generate the control signal.

United States Patent Application 20060273909 by Heiman, et al. and published on Dec. 7, 2006 is for a RFID-based toy and system. It discloses a system that includes a wireless transmitter and a RFID antenna array adapted to transmit information representative of RFID tags located within the RFID antenna array reception area. A toy that includes an RFID reader adapted to interact with RFID tags; and an interface for allowing the toy to exchange signals with a computerized entity. A system that includes multiple toys adapted to interact with each other; wherein each toy comprises a RFID reader and an interface for exchanging signals, directly or indirectly with another toy.

United States Patent Application 20030191560 by Yokoo, et al. and published on Oct. 9, 2003 is for an electronic pet system, network system, robot, and storage medium. It discloses a virtual electronic pet and a pet-type robot that changes the state of the emotion and the state of the instinct as the internal state of the electronic pet (information included in pet characteristic information) in accordance with surrounding information and internal information, and act in accordance with the state of the emotion and the state of the instinct. Transmission/reception of the internal state of the electronic pet (pet characteristic information) is made possible among the virtual electronic pet, the pet-type robot, and a personal computer. Thus, the action of the electronic pet is implemented by each device in accordance with the internal state of the electronic pet changed by another equipment.

United States Patent Application 20030124954 by Liu and published on Jul. 3, 2003 is for an interactive toy system. It discloses an interactive toy has a microphone, a speaker, a memory for storing a toy identifier, and an interface to provide communications with a computer system. The computer system connects to a server on a network. The interactive toy provides electrical signals from the microphone, as well as the toy identifier, to the computer system via the interface. The interface enables the computer system to control the speaker to generate audible information according to data received from the server. Alternatively, a processor and memory with networking capabilities may be embedded within the toy to eliminate the need for a computer system.

United States Patent Application 20030003839 by Lin and published on Jan. 2, 2003 is for an intercommunicating toy. It discloses an intercommunicating toy comprises a toy body; a storage device inside the toy body for storing a first data; a communication interface inside the toy and electrically connected to the storage device for transmitting a second data to update the first data in the storage device; a controller inside the toy body and electrically connected to the storage device for controlling the communication interface in order to update the storage device; and a wireless communication device inside the toy body for providing an intercommunication effect with another intercommunicating toy according to a control command of the controller.

United States Patent Application 20020061702 by Dan, et al. and published on May 23, 2002 is for a toy having detachable central processing unit. It discloses a toy having a detachable central processing unit is comprised of a central processing unit with a built-in growth algorithm for having the toy grow, a driving unit for exhibiting action according to growth or outputting an audio information and a link unit for linking the central processing unit and the driving unit. Therefore, in case of using just the central processing unit, the toy with which the toy can grow or to which application programs are installed using the cyber character so as to utilize as a Personal Digital Assistant (PDA), mobile phone and a computer for home-use. Also, in case the toy is combined with the central processing unit, it can perform more improved actions thus to give a variety of learning chances and attract a variety of interest.

There is still room for improvement in the art.

SUMMARY OF THE INVENTION

A system and method for a toy with mass storage (memory; flash memory) capabilities and a method for the toy to connect to other like toys and to a computer and the internet for online virtual play and simulation. Connection to a computer system allows the user the ability connect to the internet and register the toy allowing the user access to interact with a virtual activities and scenarios including a virtual computer image and animation of the toy connected to a computer which is connected to the Internet. The system then allows the user to purchase additional toys to enjoy additional benefits using team work/play between individual toy characters traits that are stored in the memory of the toy for play when in the virtual world on the website. User may also purchase or win a USB (Universal Serial Bus) node or link key with codes that attach to the USB connection on the toy to allow access to special rooms and events in the virtual world on the website. While on the website and in the virtual world the user can save their position in the virtual word or game back to the physical toy at any time to resume the game at the same place when connected at a later time. The status of the game is saved back to the memory storage in the toy.

Toy can also be used as a stand alone mass storage device. User can plug the toy into the computer to save all forms of computer data for transport and storage. Used as a mass storage device it can hold all types of computer data. A mass storage device that is soft and plush can stand or sit in position and be connected to the computer. Additional mass storage toys can be connected to other toys or devices to add storage.

User connects the USB toy to the computer and is presented on the computer desktop with an icon of the mass storage device. The icon being the shape and character of the toy being used. The user then clicks (via the computer mouse) on the mass storage device icon to open the device on the computer. Once the icon is open a web site location and any other information such as registration, electronic books, music files, video files, and advertisement would be present. Once the website location (URL) icon is clicked the web browser is started and the page containing the virtual world is loaded. Once the user is at this location the device is registered and the user can input some personal information. The toy can also be pre registered prior to purchase by the retailer to allow for the element of surprise when given as a gift. Once at the web site, the toy is registered and the user can enter the virtual world. In the virtual world the toy has a virtual presence. The user can collect other toys and add characters to their collection. The virtual world contains games and worlds where traits inherent in the characters have advantages and disadvantages when playing games or exploring worlds. The user is encouraged to purchase additional toys and build teams with traits that complement each other and provide an advantage while playing and exploring: an example would be one toy that is a cheetah, cheetahs are fast, the second toy might be a gorilla, which are strong. This gives the user a combination or team that is fast and strong. Additional devices that connect to the USB appendage of the toy allow the user to access to rooms not accessible unless the node or dongle are present. The node or dongle contains a code that allows access to special rooms or areas in the virtual environment that is not accessible to users with out the node. These areas would only be accessible when the node is connected to the toy. Nodes would be won by users for acomplishments in games and scenarios in the virtual world. The user can build a virtual house and maintain their virtual toy. Tokens can be collected to purchase virtual items for the toys or virtual items for the virtual homes built for the toy or to purchase nodes for access to special areas, rooms, games, events or prizes in the virtual world.

Toy can be used as a means to sell storage space to other retailers, organizations, manufactures, operations or products and services to have advertisement stored on the device. The advertisement once viewed or not can be eliminated or deleted by the user if desired. Within the mass storage device at point of purchase there is data space available on the device, this space can be used for advertising by the retailer, manufacturer or developer. The advertiser would then customize their advertisement to include pictures, sounds and video. The toy can be licensed to hold and distribute new movie preveiws that are coming to market. Special characters based on movie characters would be issued that would hold data and movie files (previews for the movie).

The mass storage device in the toy can be used to store games as well as electronic books, music, video, pictures, toy registration, birth certificate, game position, website and artwork for the user to use and enjoy.

BRIEF DESCRIPTION OF THE DRAWINGS

Without restricting the full scope of this invention, the preferred form of this invention is illustrated in the following drawings.

DETAILED DESCRIPTION

Figure 1:
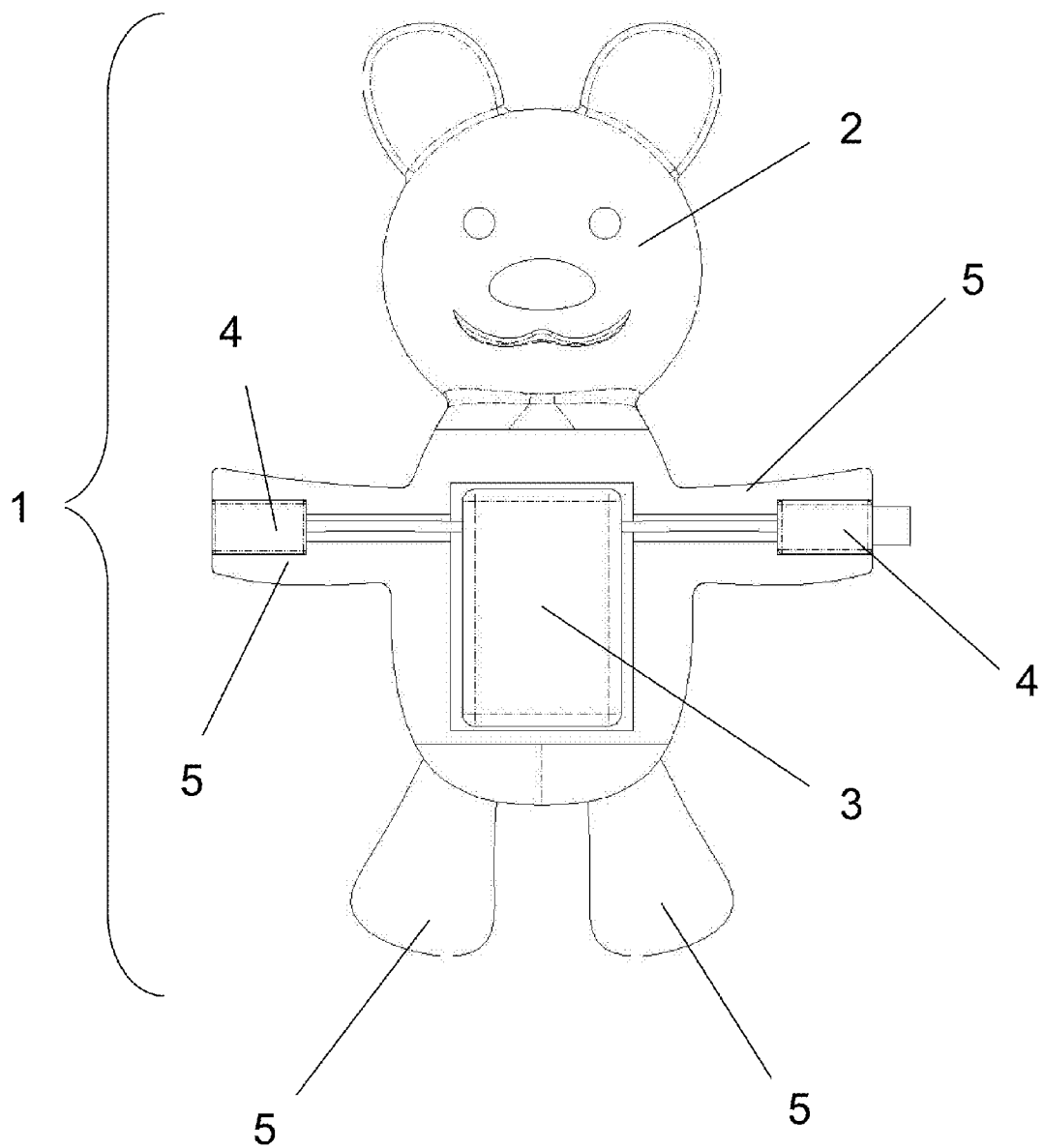
FIG. 1 displays the toy construction.
Figure 2:
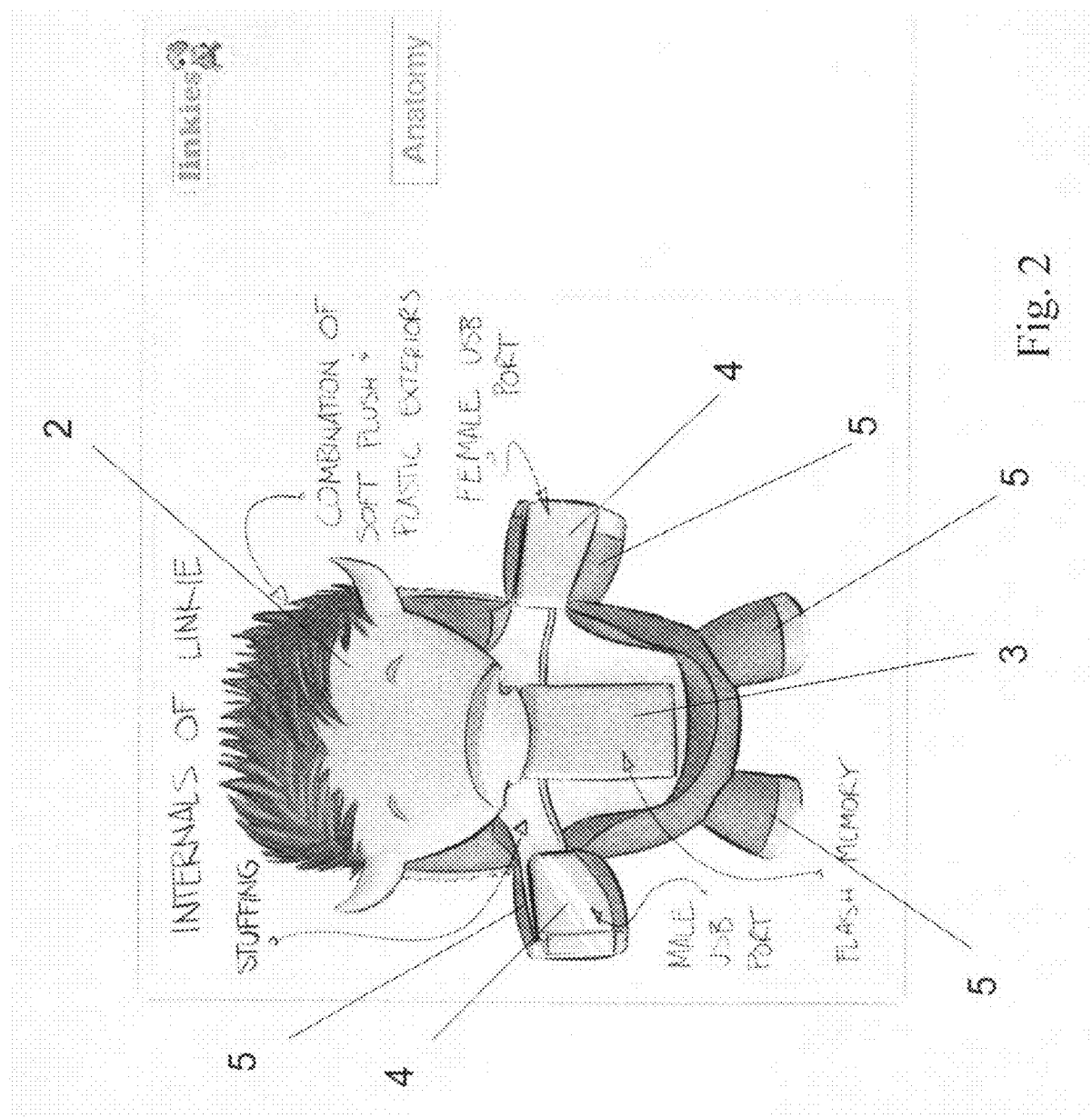
FIG. 2 displays the toy construction.

Referring to the embodiment of the invention shown in FIGS. 1 and 2 the following description of a toy (1) with a mass storage (memory) device (3) located in the body of the toy (1) with USB ports (4) located at the ends of the appendages (5) (arms, legs, head and tail).

Figure 3:
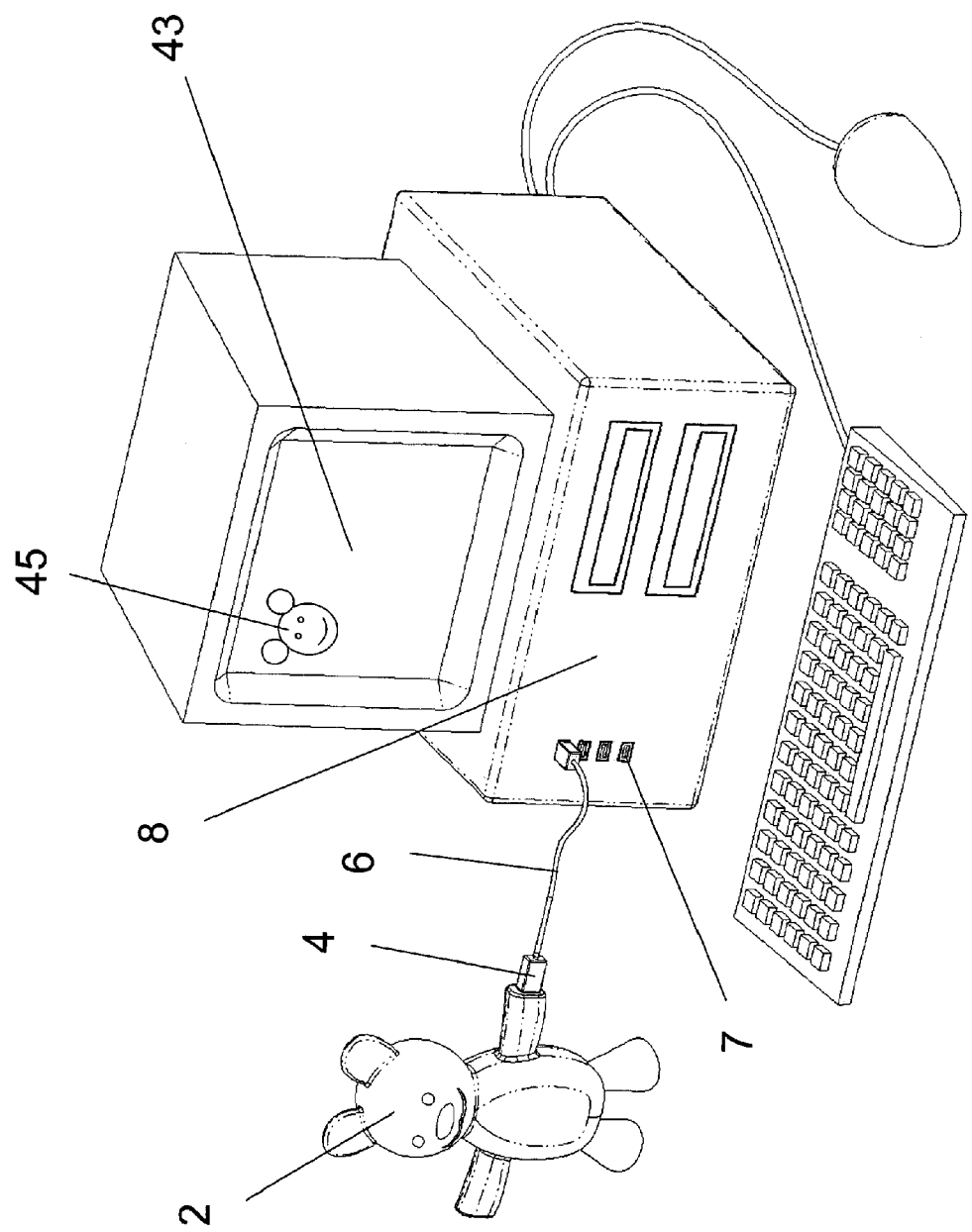
FIG. 3 displays the toy connected to the user computer via USB port.
Figure 8:
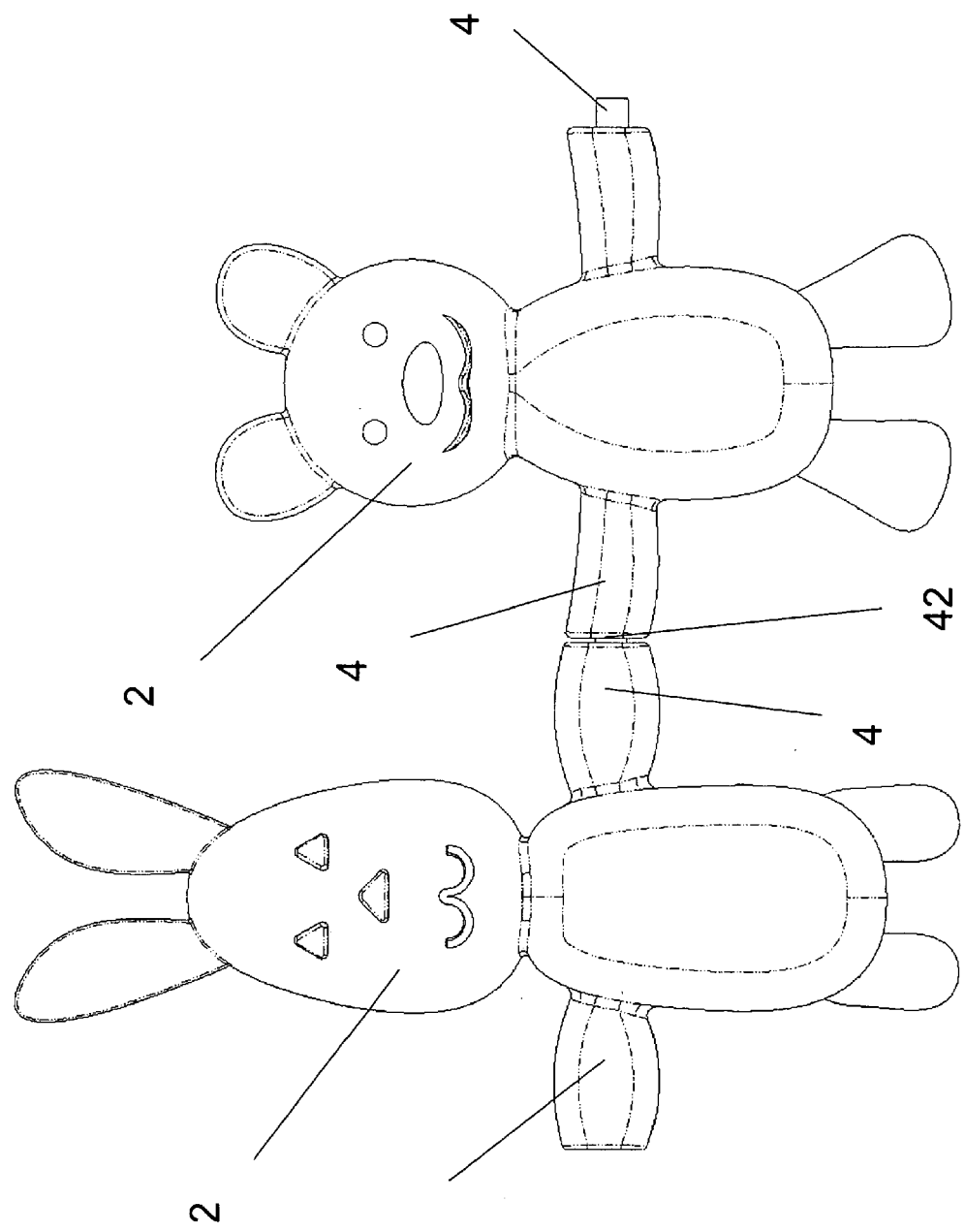
FIG. 8 displays the connection of two toys together via a USB port.
Figure 9:
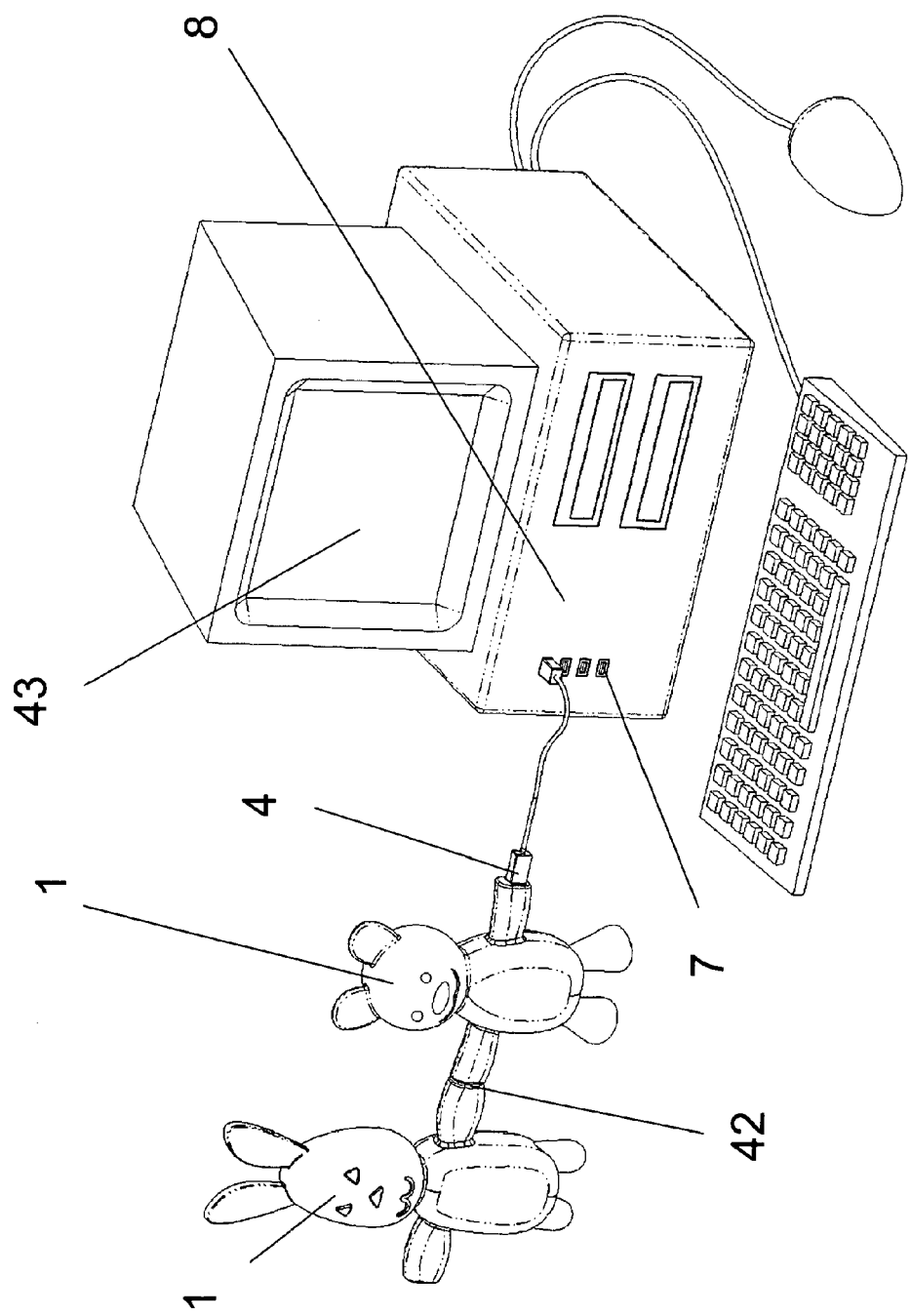
FIG. 9 displays the connection of the two toys to a computer via USB connection.
Figure 10:
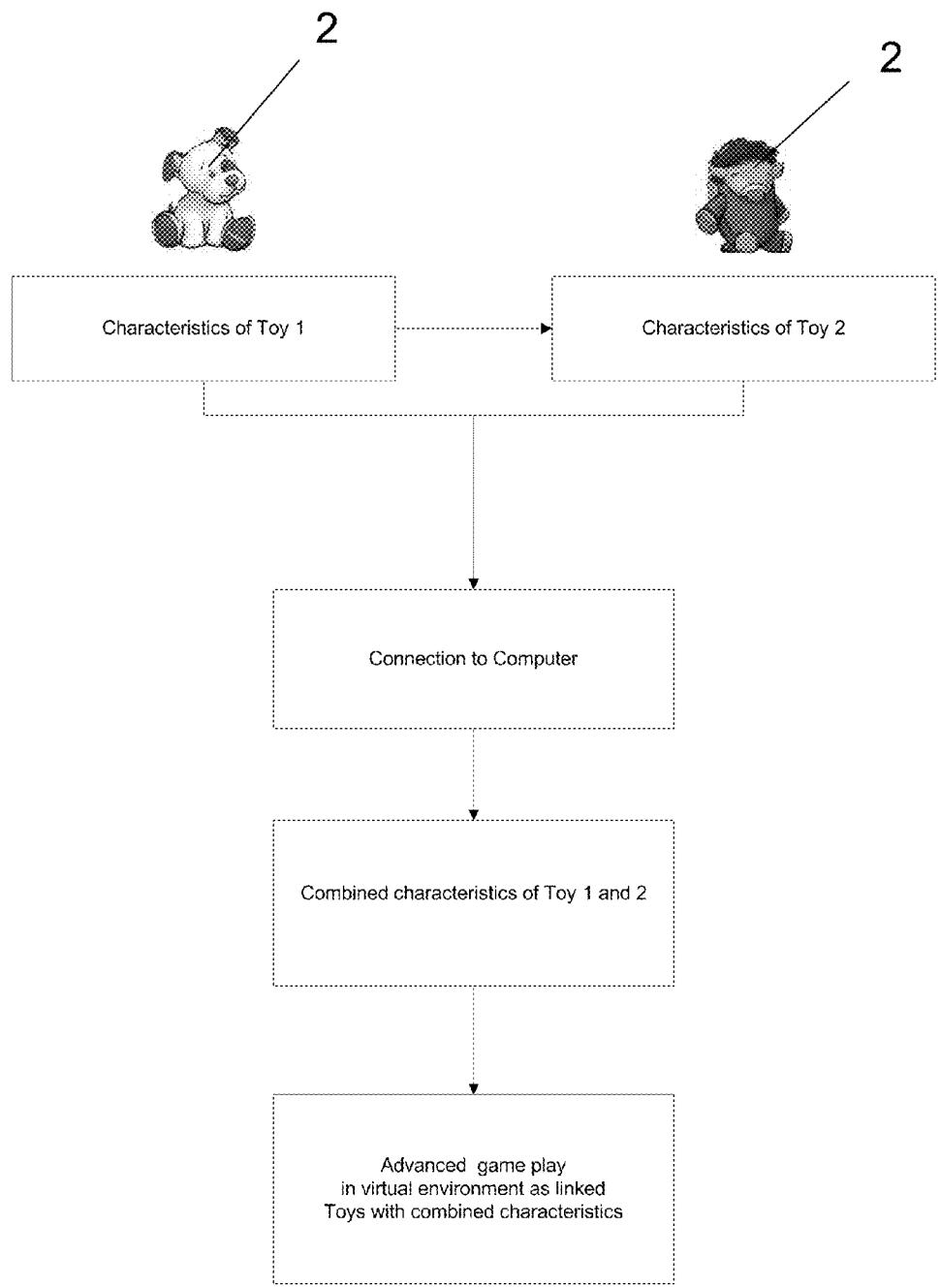
FIG. 10 displays a diagram of the sharing of traits between toys when connected for advanced game play and features.

The current invention is a toy (1) that is a USB mass storage device (3) in the shape and embodiment of a soft plush character or rigid character based toy (2). The toy (1) would feature both male and female USB connections (4) that would be located at the end of an appendage (5), arm, leg, head, tail etc. or in the cases of unique creatures it could be on another part of the body or clothing etc. This toy serves as a child's toy (1) as well as place for the user to save data to and retrieve data from when, connected to a computer in the mass storage (3). In the preferred embodiment, the age limit would be four to adult depending on the shapes and design of the creatures/characters or toy (1). FIG. 3 illustrates that toys (1) can be linked (42), USB (4) male to USB (4) female, to the computer (8) via an appendage (5) or a whip (cable) (6) to link (42) the toy to the computer. Toys (1) can also be linked (42) together either through appendages (5) or via a cable (6) as shown in FIGS. 8, 9 and 10. This allows the user to share data and stored information or increase memory capacity by using more than one toys mass storage device (3).

Figure 4:
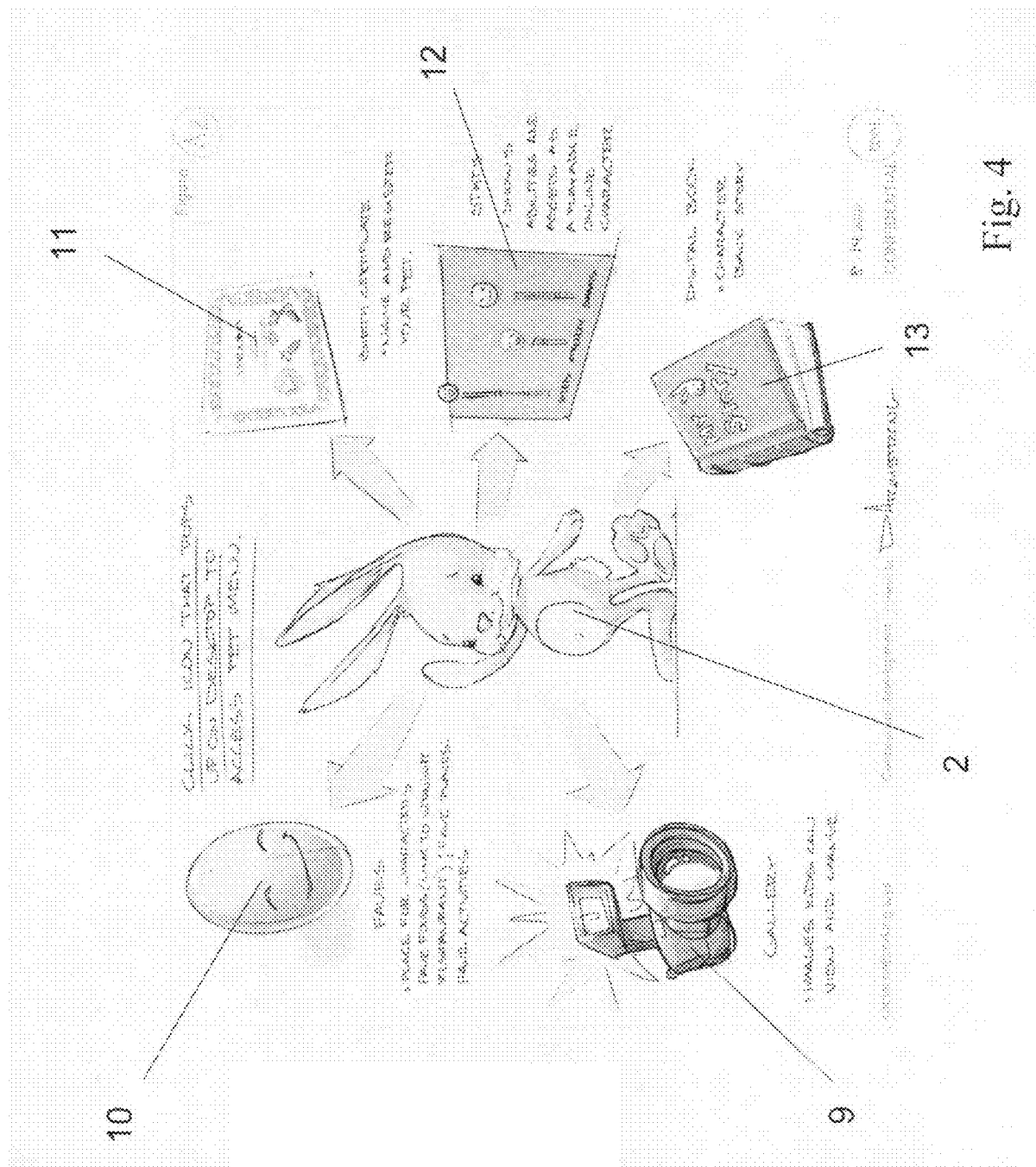
FIG. 4 displays a graphical representation of the contents in the toys memory.
Figure 5:
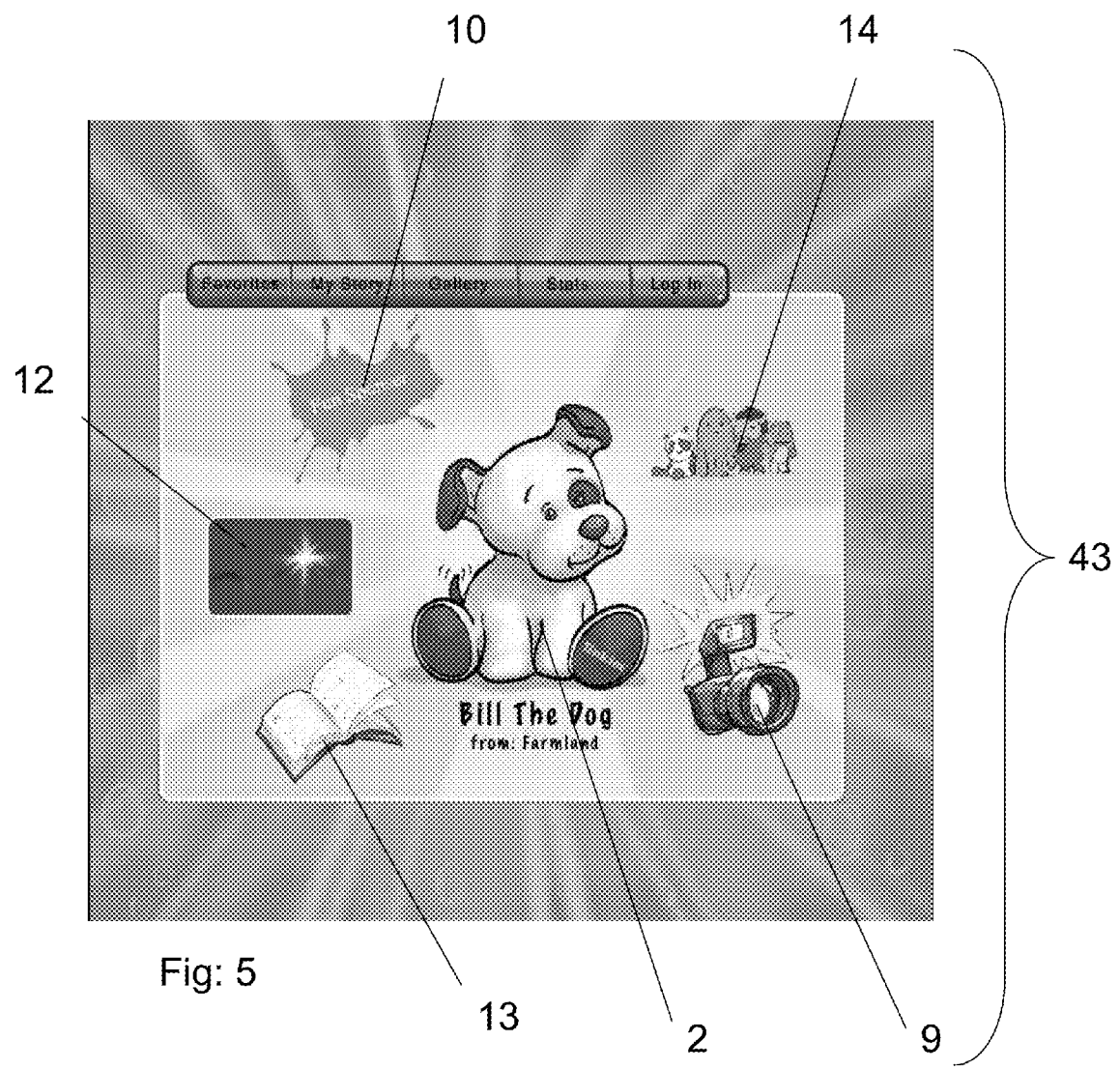
FIG. 5 displays virtual representation of the contents in the toys memory as seen on screen by the user.

As shown in FIG. 4, the Toy would have pre-stored item in the memory (3) such as birth certificate (11), character traits and capabilities (12), digital book (13), images (9), music, video, forms of advertisement (10), games, or software to install on the user's computer (8). As shown in FIG. 5, illustrating the computer display (43) a sponsored link can be placed in the mass storage (3) this allows other retailer, manufactures or organizations the ability to advertise on the toy by placing advertisement (10) for the retailer or organization or allowing advertisement for other companies such as, upcoming movie releases, DVD releases or special events could be advertised via promotional previews stored in the mass storage (3) in the toy (1).

Figure 6:
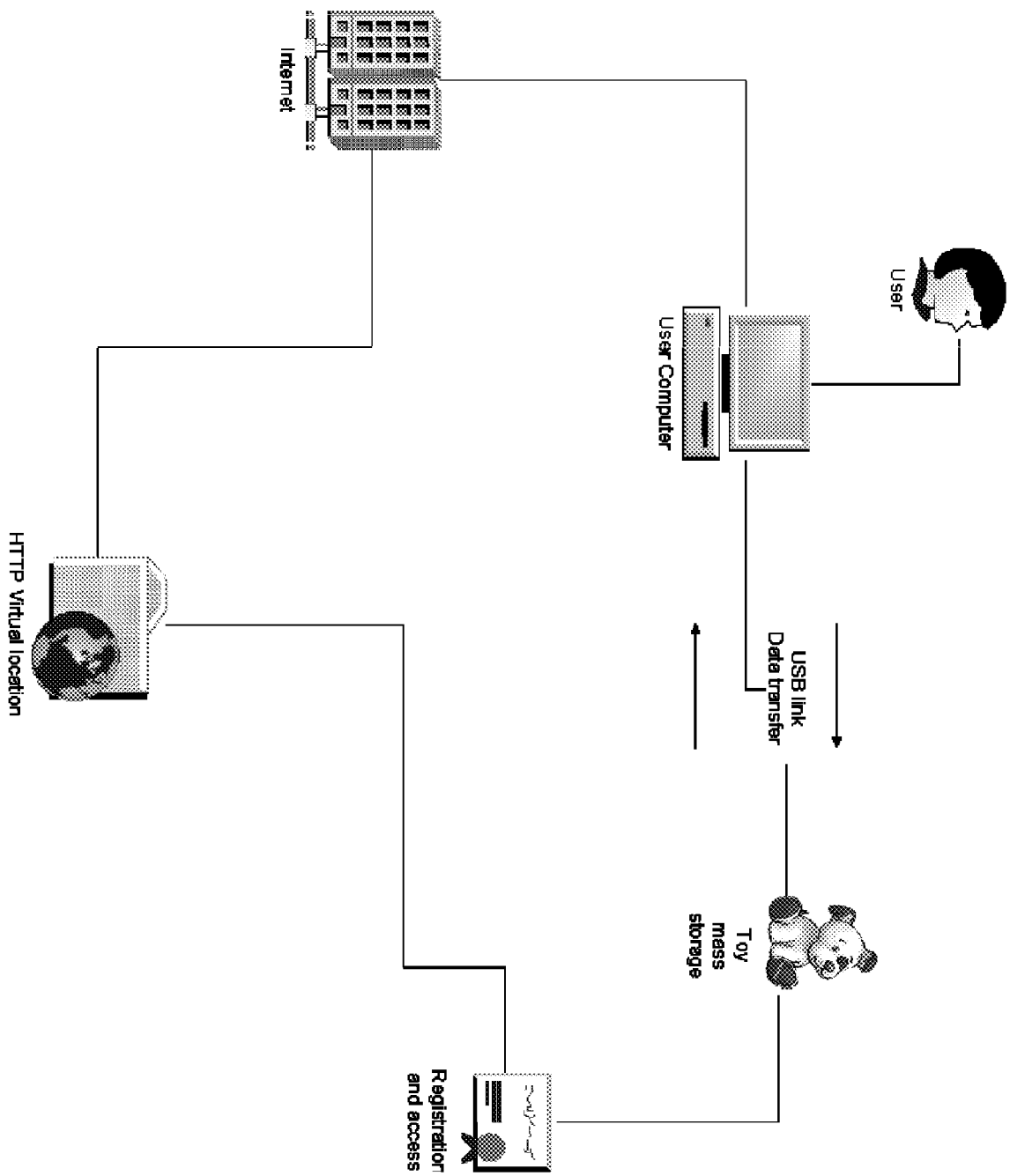
FIG. 6 displays a diagram of the toy connected to the computer that is connected to the internet and the registrations of the toy.

As shown in FIG. 5 and diagramed in FIG. 6, inside the memory (3) at point of retail is web address (URL). The user connects the toy (1) into the computer (8) the toy shows up on the computer display (43) as a mass storage device icon (45) on the computer desktop. The user then clicks on the storage device icon (45) to open the icon (45) and to get to the link to the web address that allows access to the web site location. Once the web address icon (45) is clicked it opens the browser and takes the user to the virtual world where the toy is registered and birth certificate (11) is created and the user can enter the virtual world on the web site and play games and win prizes, participate in activities (38).

FIG. 6 illustrates the linked connection between the toy (1) the computer (8) the internet and the registration birth certificate (11).

Figure 7:
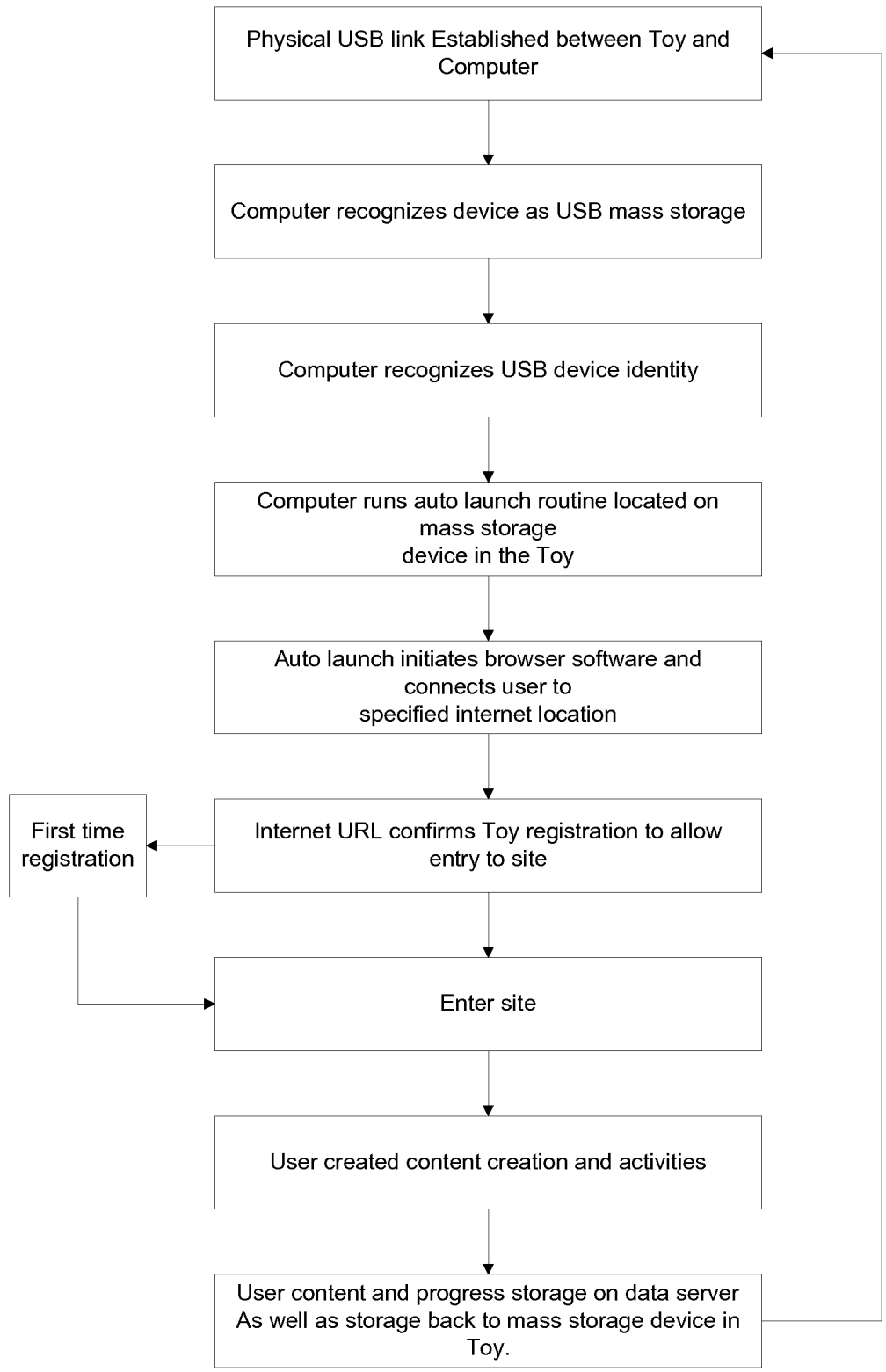
FIG. 7 displays a diagram of the sequential steps of the connection of the toy to the computer and to the internet as well as entering the virtual world and saving data (content)

As shown in FIG. 7 the chronological steps that the user takes connecting the toy (1) to the computer (8) via the USB ports (4) and therefore connecting to the internet and registering the toy (1) with the web site, obtaining a birth certificate (11) and then entering the site to enter the virtual world. Users already registered enter the web site immediately as pre registered users.

Figure 11:
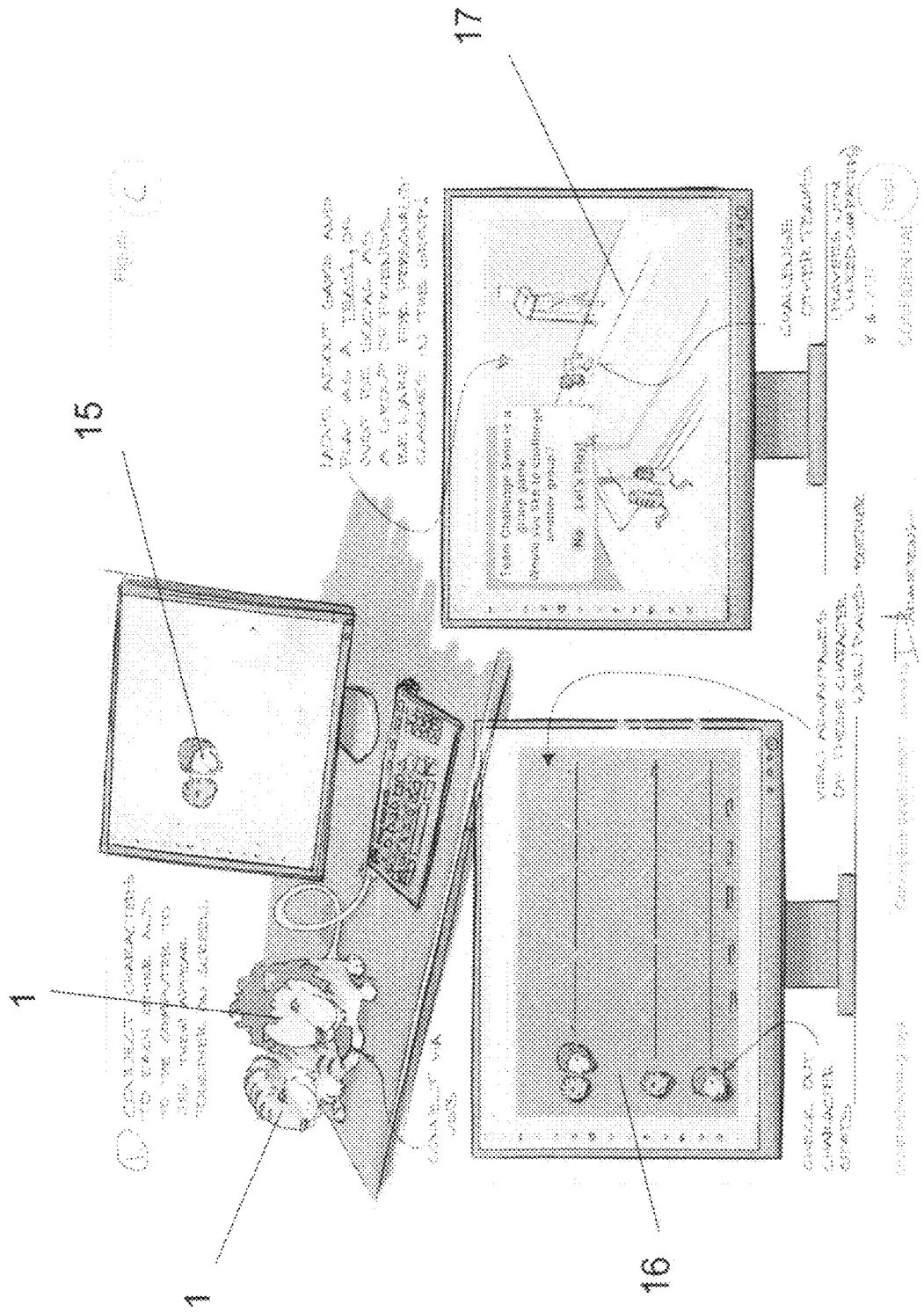
FIG. 11 displays a graphical representation of shared traits or characteristics of multiple toys connected to each other and a computer and how the information is displayed to the user.

FIG. 8 shows the linking or multiple toys (1) together via a male and female USB (4) port. The multiple linked toys (1) are then connected to the computer (8) to allow for advanced game play as shown in FIG. 11. Each toy has traits (12) that are unique to the toy (1) these traits (12) are software protocols that are stored in the memory of the mass storage (3) in the toy (1) and give the each toy a unique set of characteristics (12) that when linked (42) to another toy (1) allow for the pairing of these traits (12) for grouped and advanced game play and activities (17).

As shown in FIG. 9 the multiple toys (1) are linked via USB ports (42) to form a shared trait (12) team. FIG. 9 shows the linked toys (9) connected to the computer (8). Once linked (42) to the computer (8) the paired traits (12) of the team of toys (1) can then engage in paired game play and activities (17) on line in the virtual world.

Figure 12:
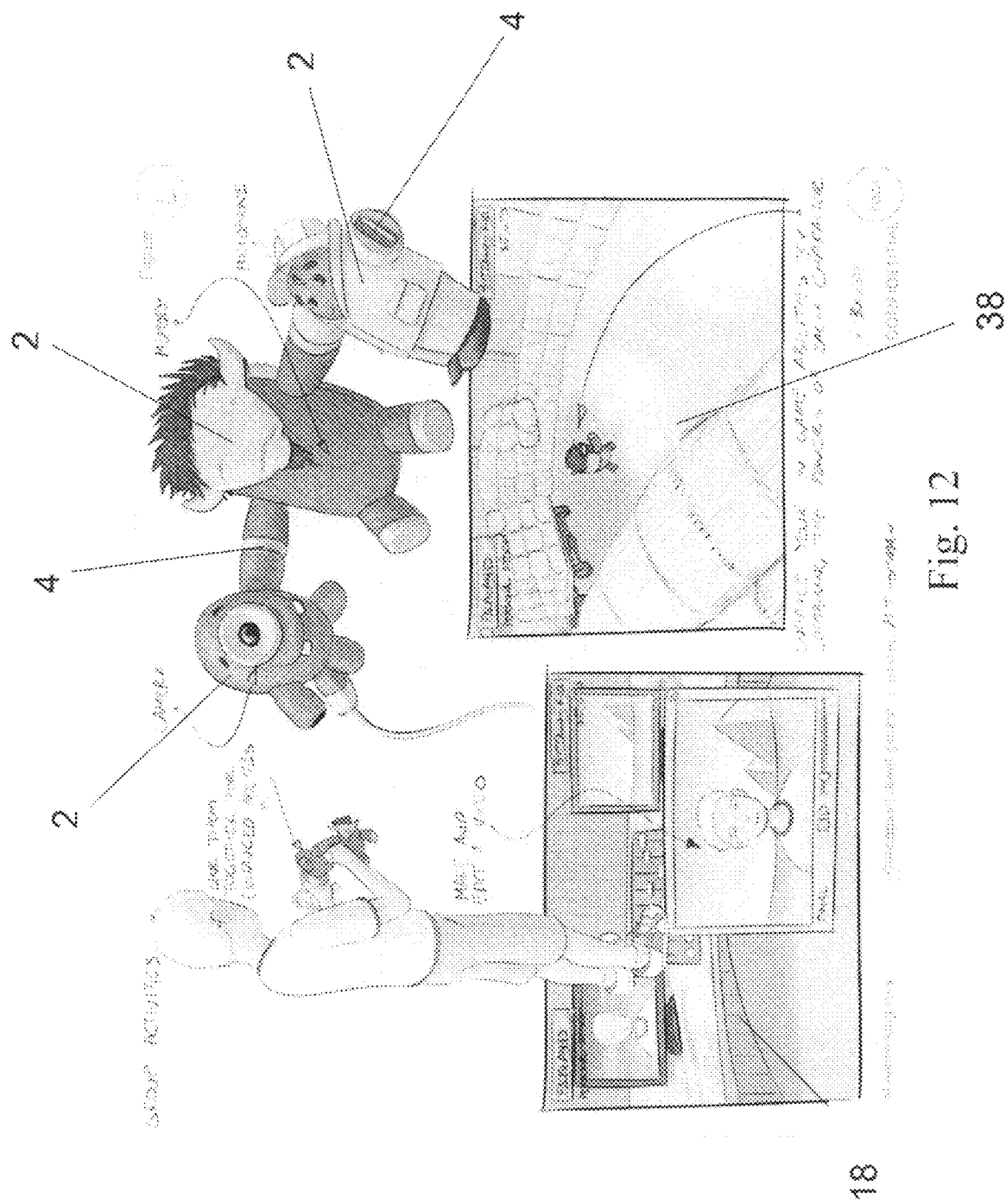
FIG. 12 displays a graphical representation of shared traits or characteristics of multiple toys connected to each other and a computer and how the information is displayed to the user.

FIG. 10 diagrams the linking of multiple toys (1) and that traits (12) are overlapped and shared to show a combinations of shared traits (12, 16). FIG. 11 illustrates the linked characters avatars displayed on the computer screen and the overlap of the traits and illustrates the combined toys in game activity with other combined toys avatars from other users in the virtual environment. FIG. 12 also illustrates the linked toys together and with accessories such as a camera and the screen interface the user would see when making a connection involving a toy (1) with other accessories.

Figure 13:
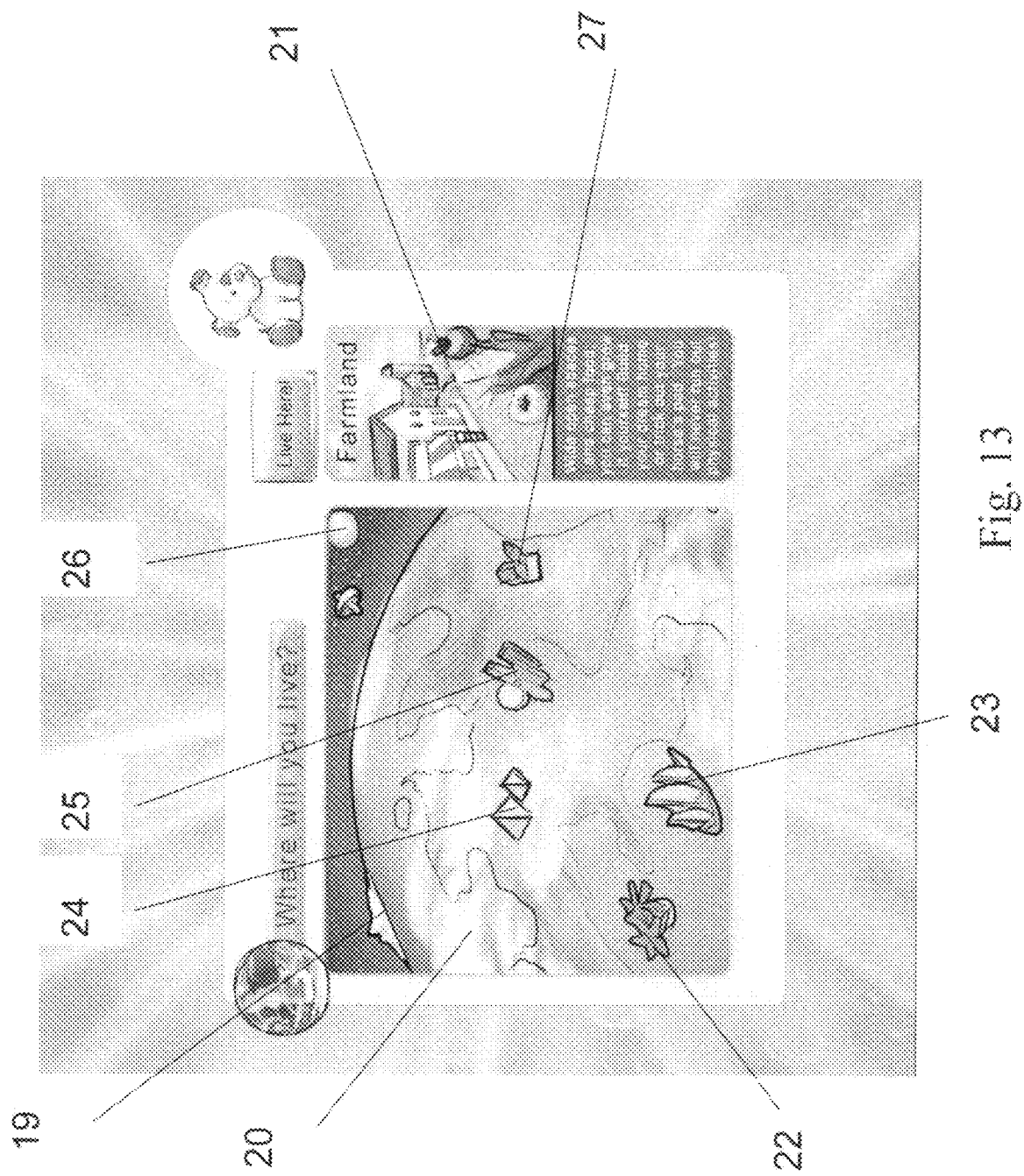
FIG. 13 displays the virtual online world and its multiple locations.

As shown in FIG. 13, the virtual world (20) is described as a virtual online center that consists of multiple locations. This can be represented as stating that the virtual world has many virtual countries and therefore many virtual cities and locations. As shown in FIG. 13 locations represented that the user would select when registering the toy (1) to live would consist of Arctic Land (19), Tropical Land (22), Sea Adventure (23), Desert (24), Big City (25), Moon (26) and Farm Land (27). In FIG. 13 it is illustrated to show the description and selection (21) of Farm Land (27) that the user would select for the toy (1) to reside in the virtual world. This activity is a completed at time of registration of the toy (1) where a birth certificate (11) is generated and a location in the virtual world (20).

Figure 14:
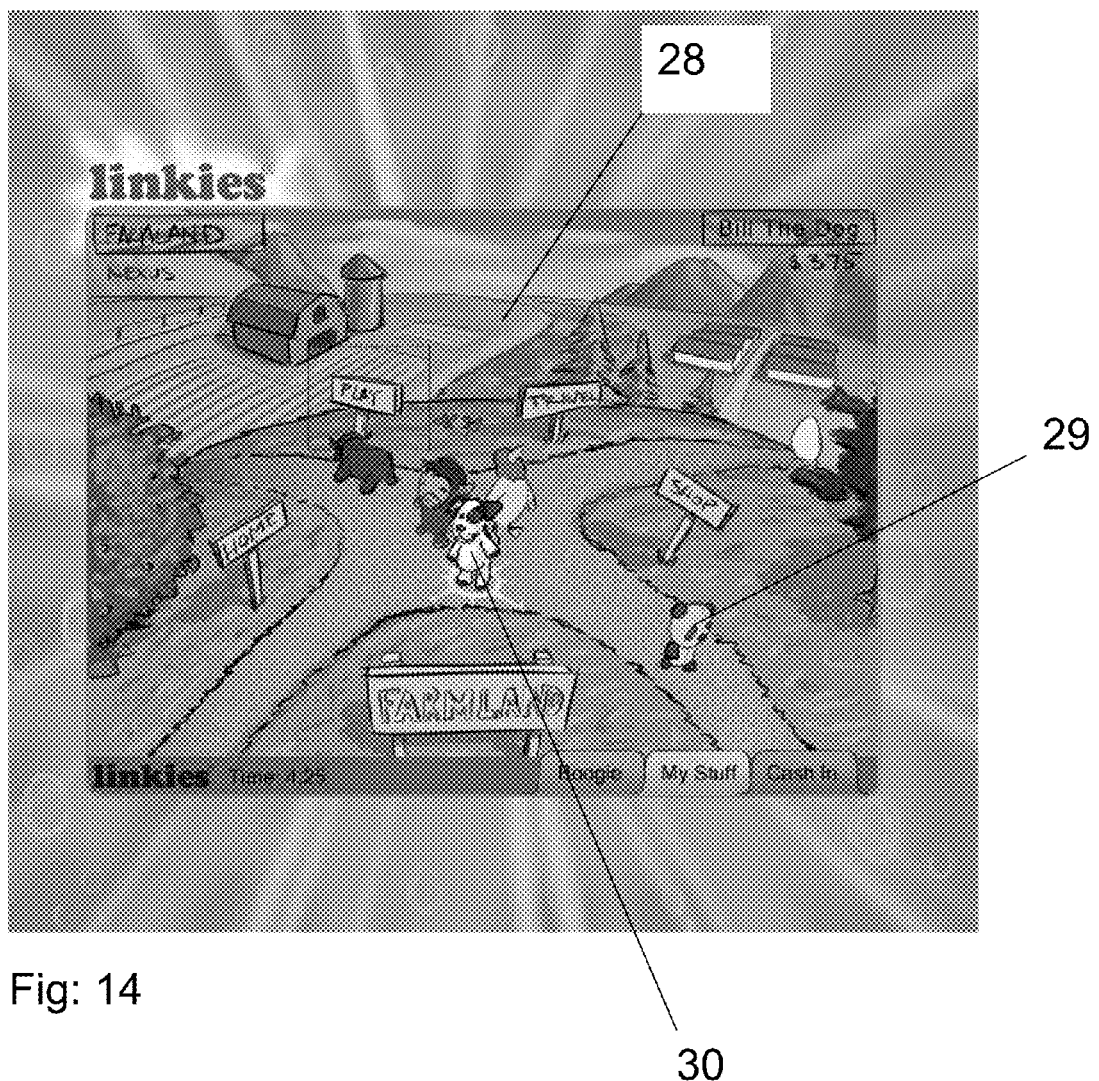
FIG. 14 displays the virtual location selected by the user and entered by the user.

As shown in FIG. 14 this is the on screen representation of the virtual world (20) selected by the user and which has been entered via the logon icon (14) that would be present on the home screen (43). FIG. 14 depicts the entrance by the user into Farm Land (27). In FIG. 14 the toy avatar (30) is shown in the environment (28) with other avatars (29) from other users.

Figure 15:
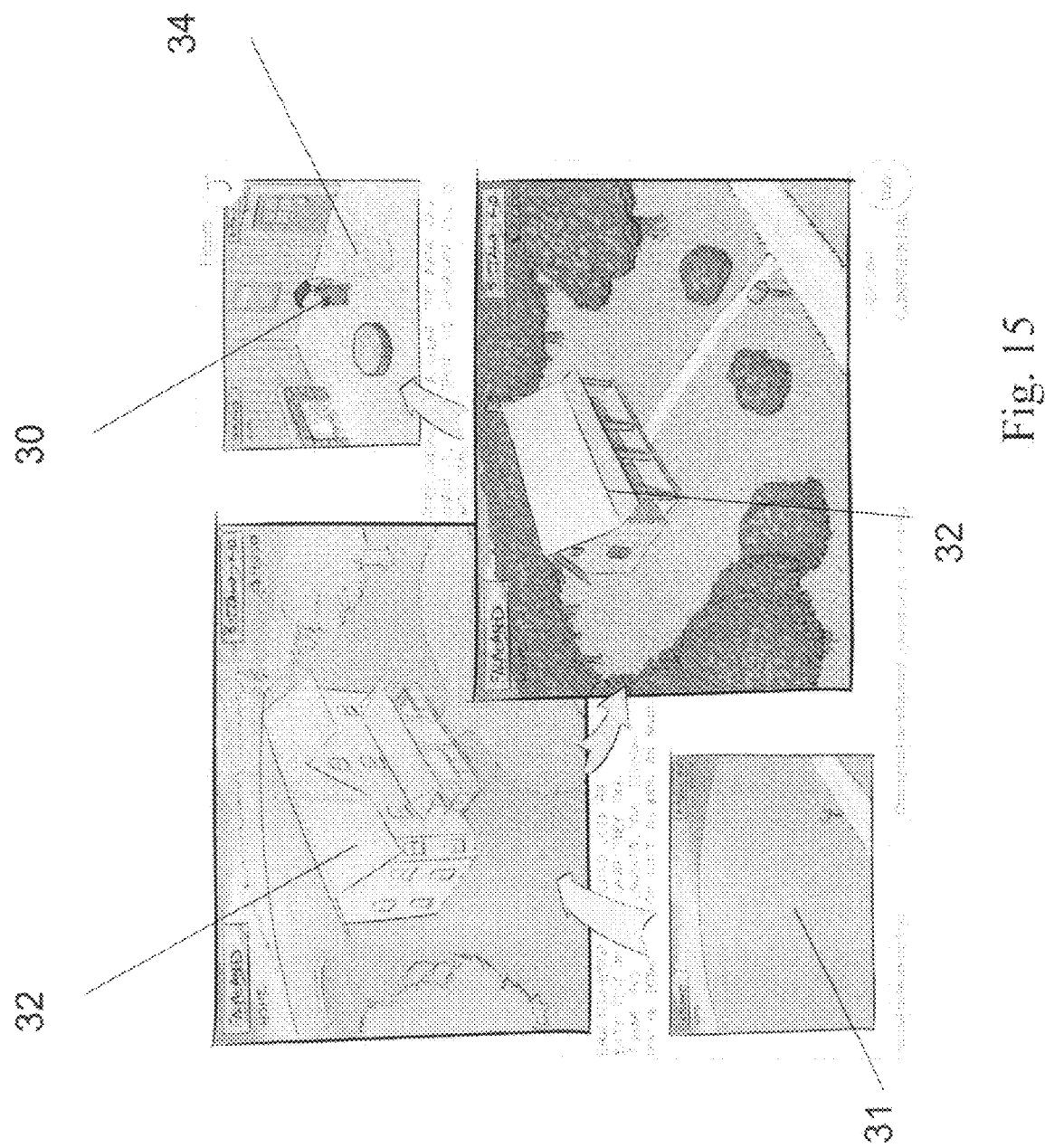
FIG. 15 displays homes and private spaces.

As shown in FIG. 15, in the virtual world the user can purchase items as they generate currency form playing games and activities (38). With the earning of currency the user can purchase a plot of land (31) in the virtual locations and then purchase a house (32) and furnish it with furniture (34). The user can continue to purchase items for their avatar and avatar homes (32).

Figure 16:
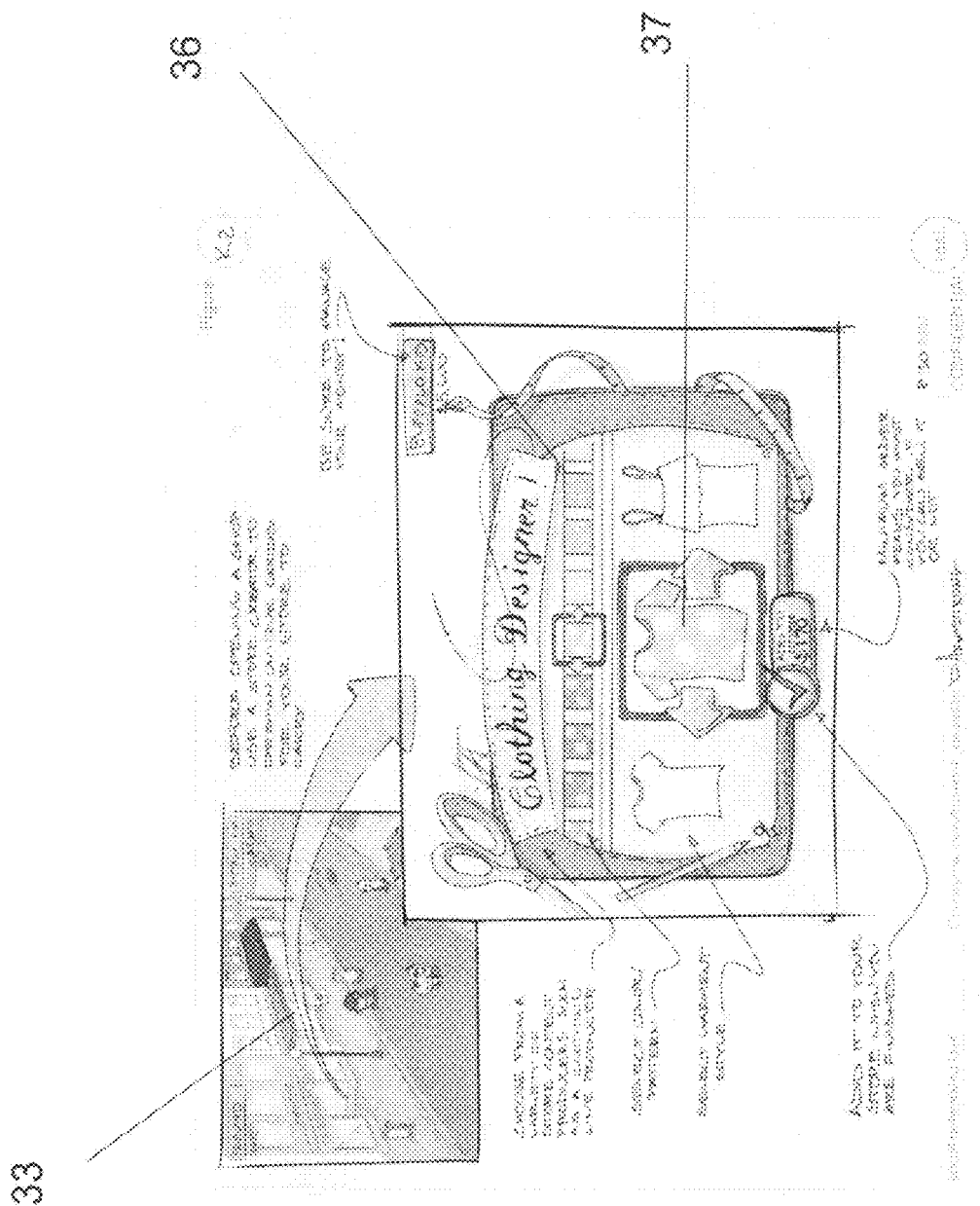
FIG. 16 displays stores.
Figure 19:
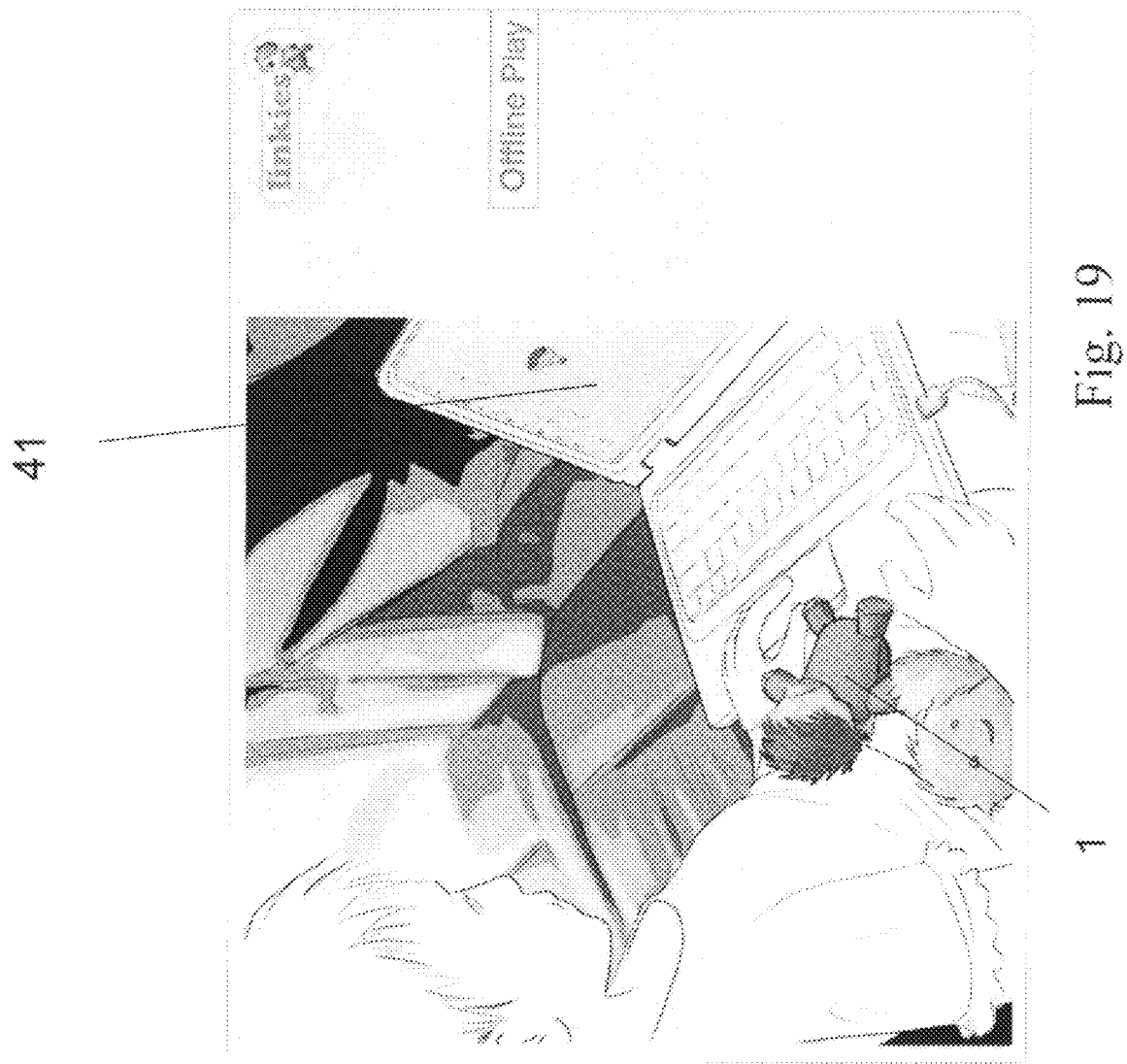
FIG. 19 displays offline game play when not connected to the internet.

As shown in FIG. 16 the virtual world contains virtual stores (33) these virtual stores are purchased by the user form currency that is generated in single user games (38) as well as paired events (17). These stores allow for the creation of content (36). The user is able to generate content (36) to sell in their purchased stores or carts. Content is defined as any virtual item or activity that is created by the toy avatar whiles either in the virtual world or while playing with toy (1) and not connected to the internet (41) in situations such as car travel or plane travel as shown in FIG. 19. Virtual content (36) consist of furniture, clothing, artwork, music, pictures, games, stories, books etc. Virtual content data is stored back to the toy (1) and resides in the mass storage (3) of the toy (1). Stores and carts (33) allow the user to sell content to other avatars in the virtual world for use and display in their virtual environments or on their avatar. Clothing designer (36) is illustrated in FIG. 16 showing the interface the user would see to create items of clothing (37). These items can then be worn by the avatar or sold in stress and carts (33) to other like avatars in the virtual world that might come into the store or visit the cart (33).

Figure 17:
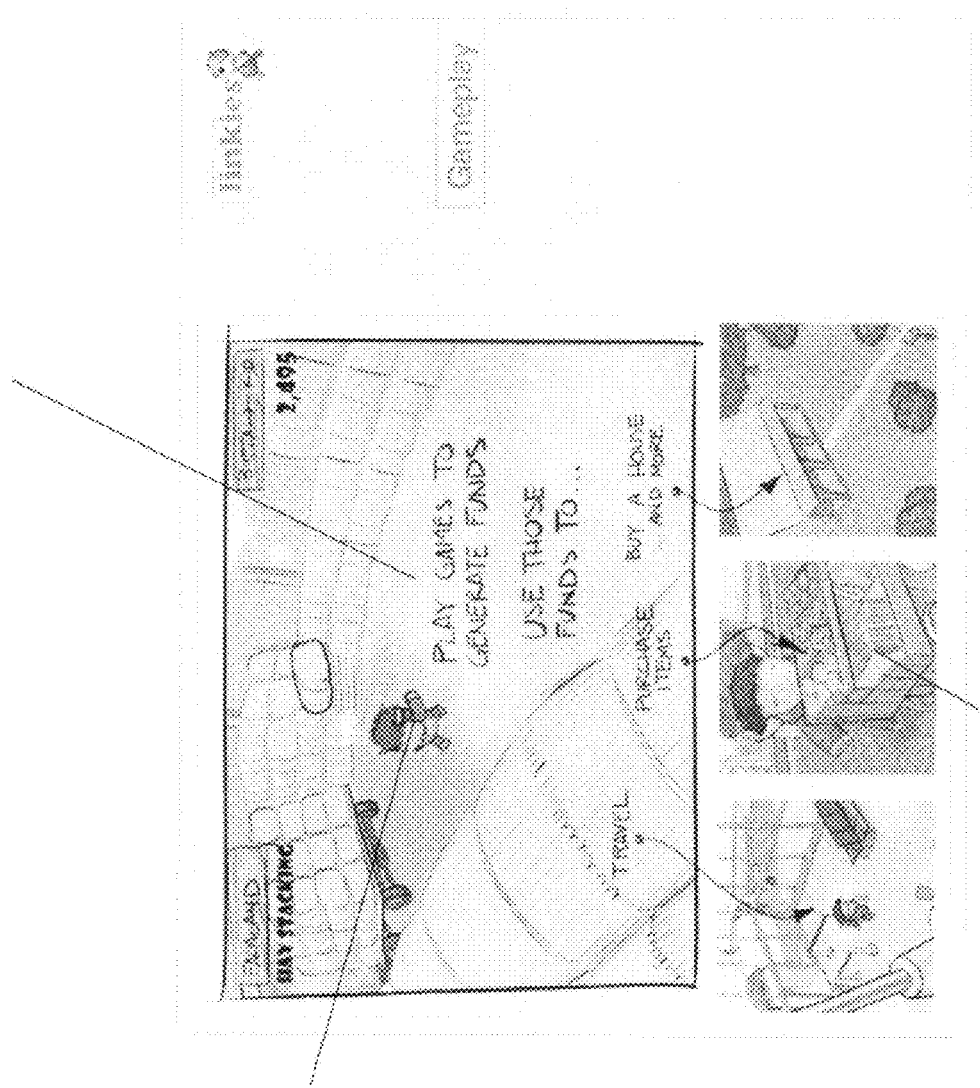
FIG. 17 displays game activities and currency earning activities.
Figure 18:
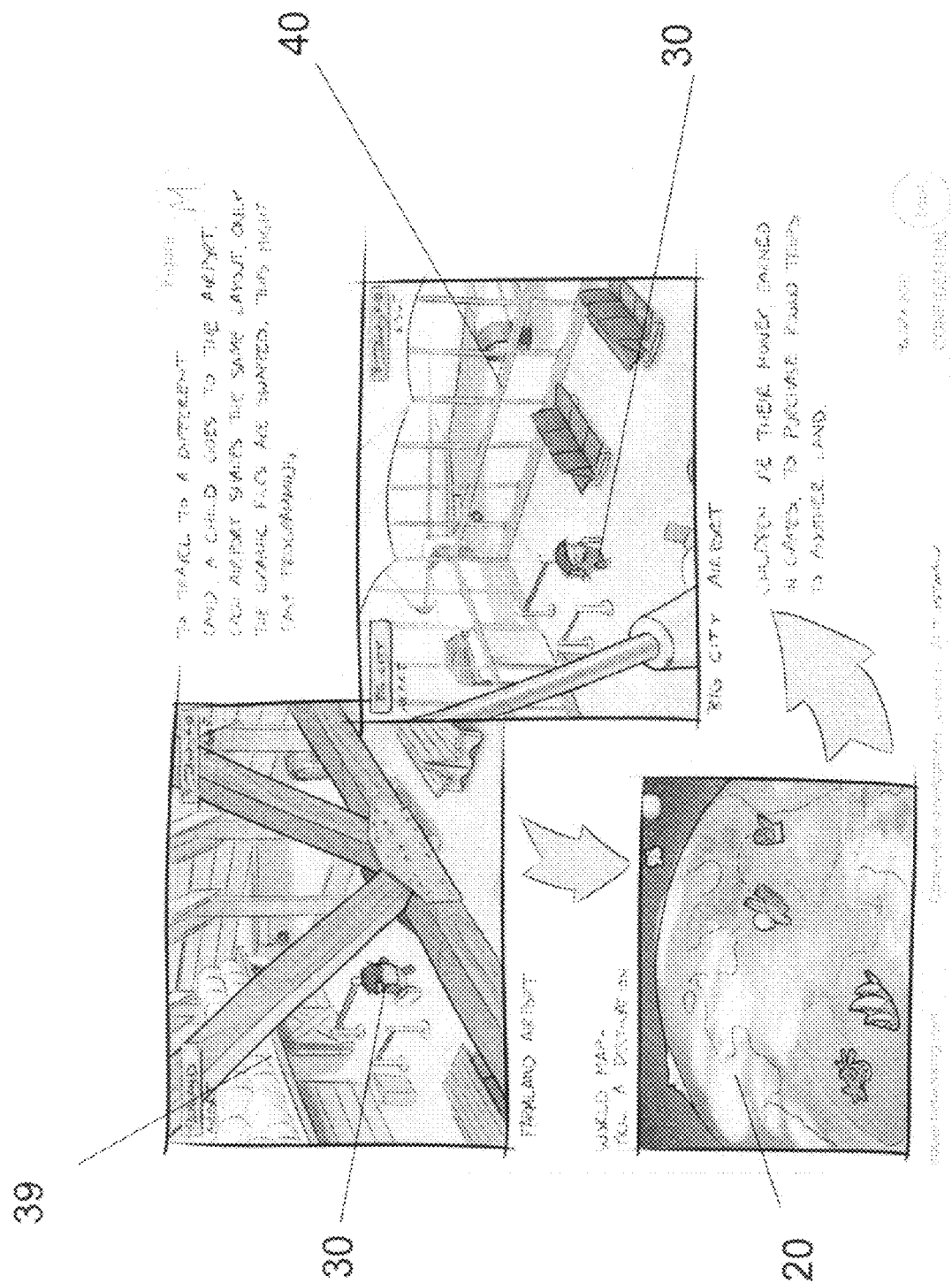
FIG. 18 displays travel within the virtual environment.

As shown in FIG. 17, the avatar can generate currency for purchases by playing games (38) and participating in events in the virtual world (20) and locations. Generating currency also allows the user to have their avatar (30) travel within the virtual world (20) as shown in FIG. 18. In FIG. 18 the illustration depicts an airport in Farm Land (39) where the avatar resides and a destination airport in Big City (40) where the avatar (30) is travelling to. This travel as depicted in FIG. 18 allows the user to explore other locations within the virtual world (20) to play in games (38) or to visit stores (33). Linked and paired toy avatars (15) can also travel and participate in games and activities.

Figure 20:
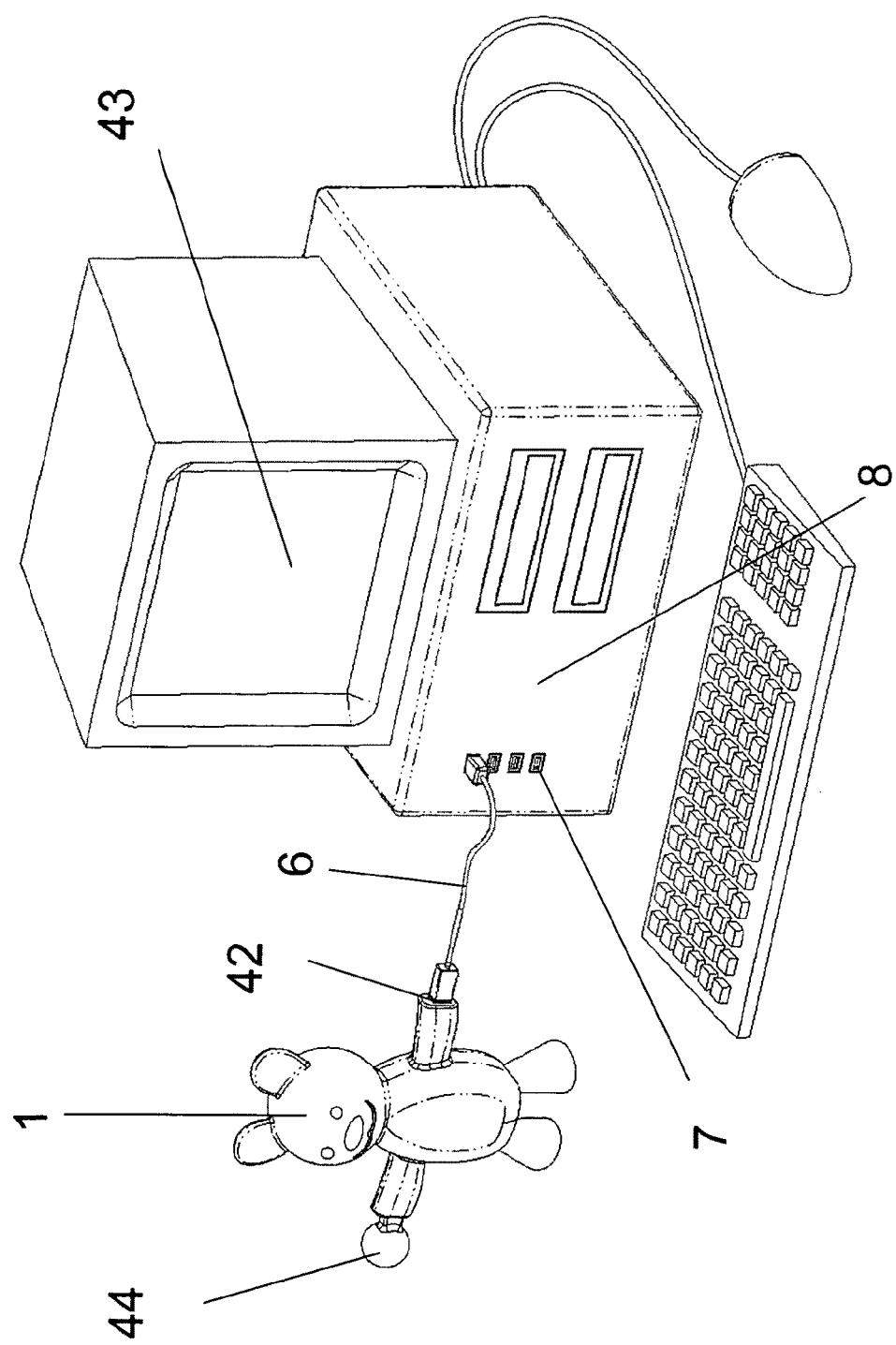
FIG. 20 displays toy with a USB node or "Link Key" connected.
Figure 21:
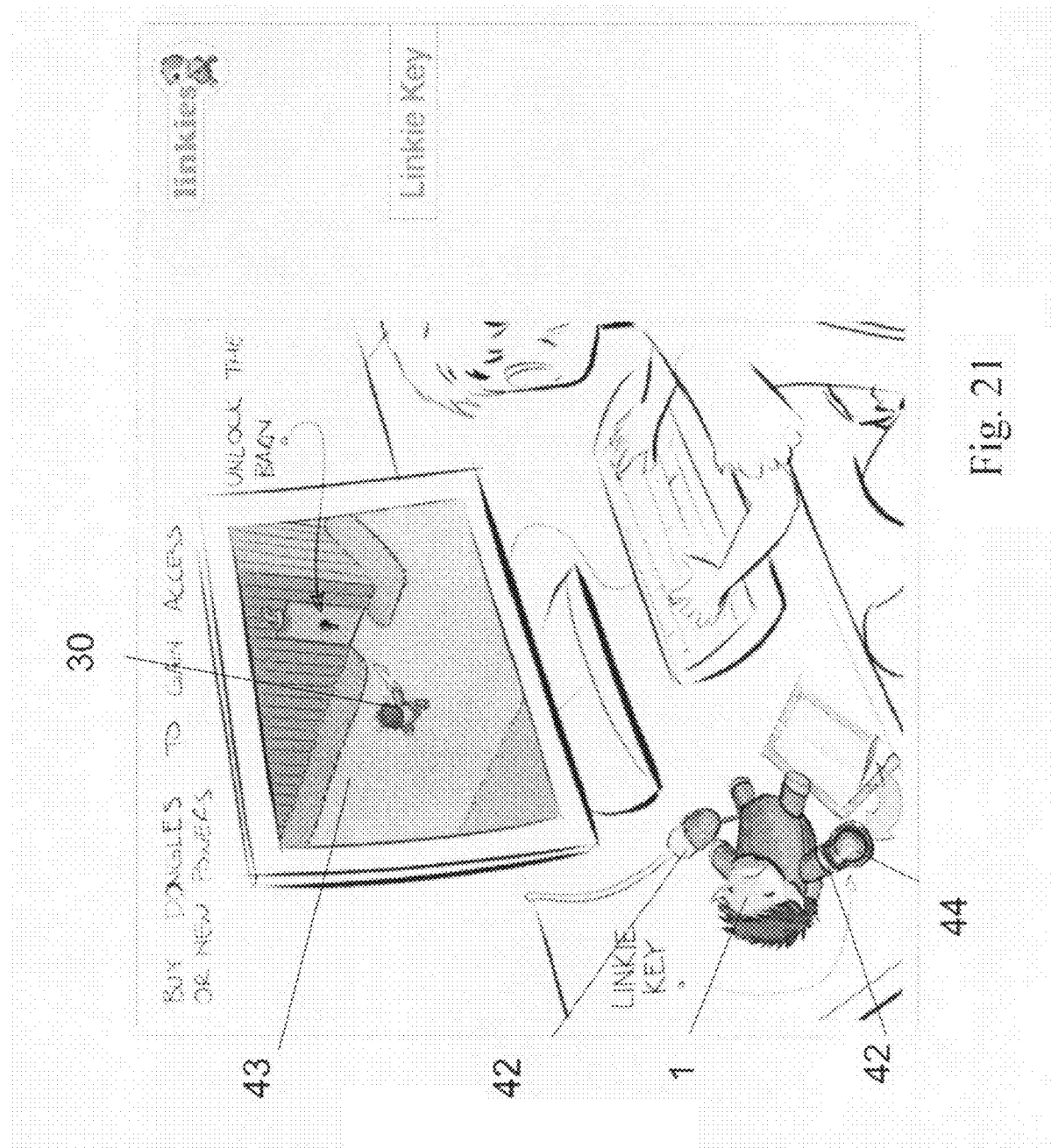
FIG. 21 displays graphically the toy with a USB node or "Link Key" connected and connected to the user's computer and the screen displayed.

As shown in FIG. 20 an accessory to the toy (1) is a node or link key (44) that allows the user to enter into special locations and event or worlds (20) that are only accessible when the link key (44) is connected (42) to the toy (1). The link key (node) (44) is a small static electronic code that is stored in a small key that can be connected to an appendage (5) of the toy (1). The link key (node) has a male or female USB (4) connector that is connected (42) to the USB port (4) located on the toy (1). Once connected (42) and the toy (1) is connected (42) to the computer (8) the key is activated and read by the web location. The user can then enter special locations or participate in special event or promotions as depicted in FIG. 21. The link key (node) would be purchased by the user or earned through game play or give to users as a promotional item.

Figure 22:
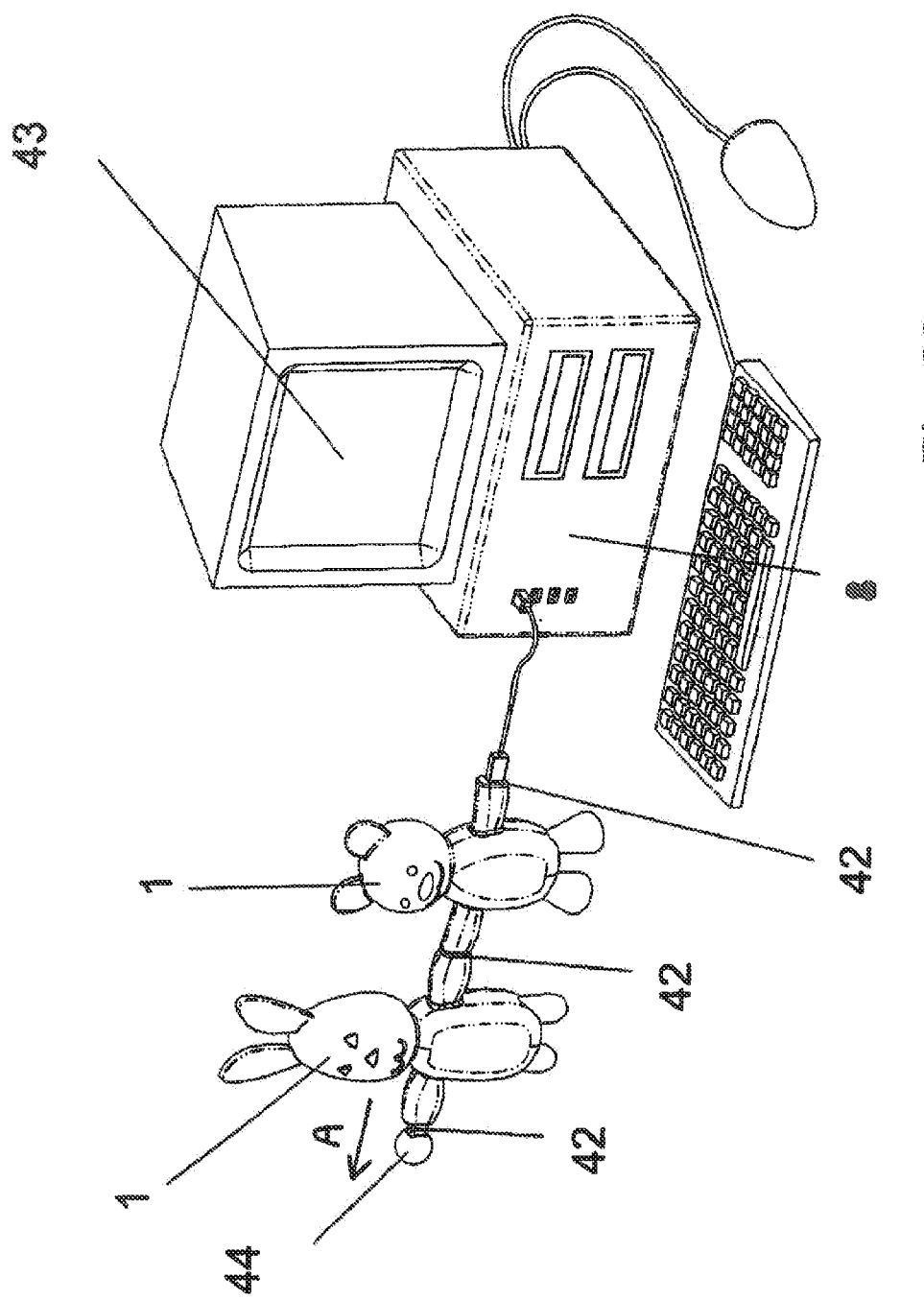
FIG. 22 displays multiple toys with a USB node or "Link Key" connected.

FIG. 22 illustrates the use of the link key (node) (44) with paired (42) toys (1). Paired toys would be allowed to enter special events and activities once the link key (node) (44) is connected to one of the appendages (5) of the toy (1) via the USB port (4). Link key (node) (44) is removable (Arrow A) from appendage (5).

Figure 23:
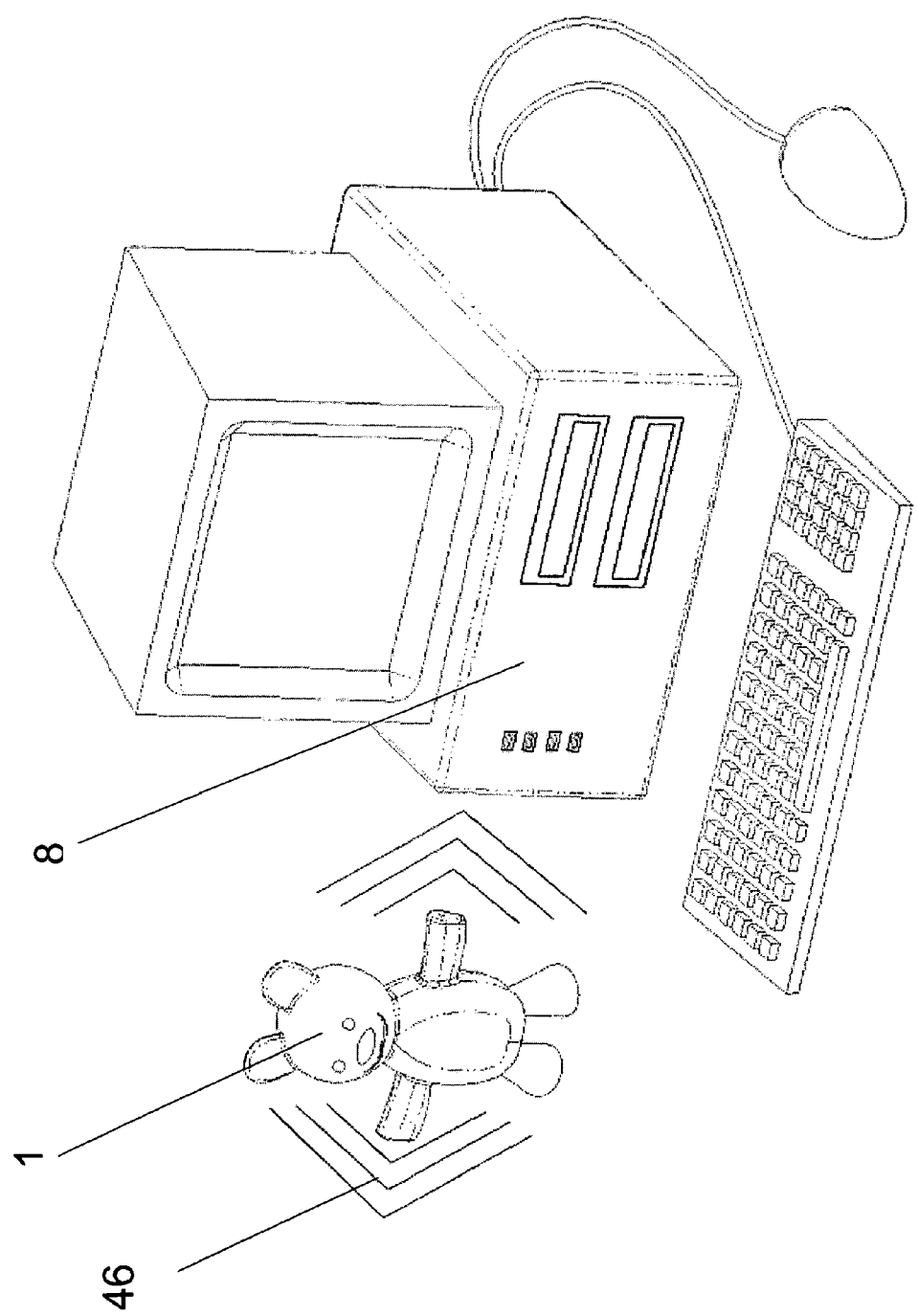
FIG. 23 displays a wireless connection between the toy and computer.

FIG. 23 illustrates alternative embodiments of the toy for making connections of the toy (1) to the computer. A wireless (46) connection is depicted in FIG. 23 that allows for a connection with the computer (8) without making a physical contact between the toy (1) and the computer (8). This wireless connection would be one of the following; WIFI or Bluetooth. All functions and activities would be identical to the USB (4) connection. The wireless (46) frequency is received by the computer (8).

Figure 24:
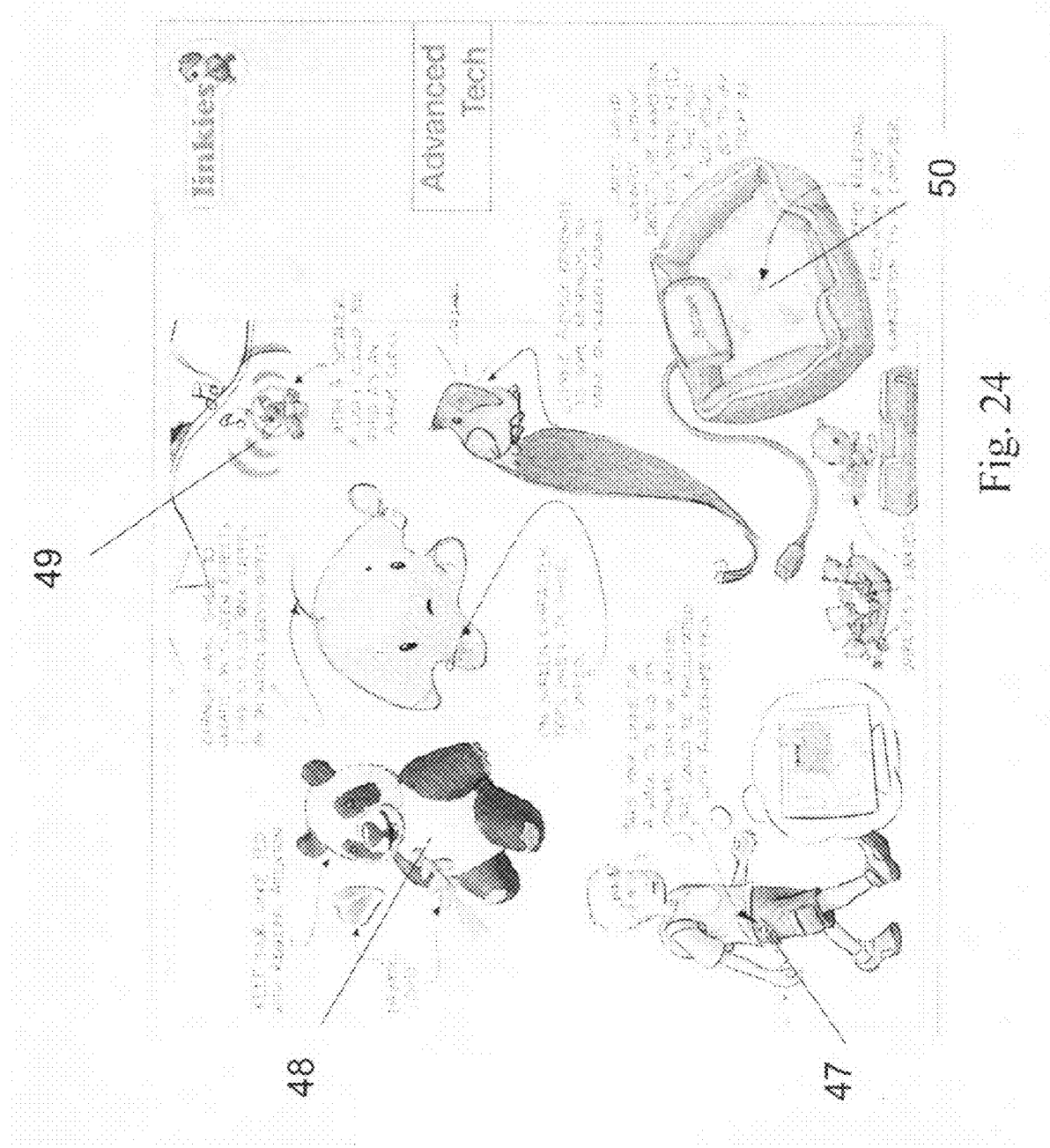
FIG. 24 displays alternate electronic features and capabilities for the toys.

FIG. 24 illustrates additional electronic capabilities of the toy (1) that would allow for advanced features. A motion sensor (47) embedded in the device would allow the motion of the device when being moved to be tracked. Once connected to the computer the motion monitoring would tabulate the motion the toy (1) went though prior to connection. Electronic food (48) can be given to the toy (1) when not connected to be registered once connected to the computer. Built in music playback capabilities (49) would allow the toy (1) to be used as a music player of digital music that is stored in the mass storage device (3) in the toy (1). A docking station (50) that would allow for multiple toy connections. Docking station (50) would be in the unique shape of a couch or a car.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An apparatus comprising:
a first toy which has a memory and is adapted to connect to a computer;
a node or dongle which is removably connectable to the first toy and has an electronic code which provides access to a special environment in a virtual world only when the node or dongle is connected to the first toy; and
a second toy having a memory and adapted to connect to the computer and the first toy wherein the toys are linked together by a male or female USB connection located at the end of an appendage;
wherein the first toy has both male and female USB connections to allow the linking of multiple toys and to link to the computer;
wherein the virtual world provides a plurality of activities for the user to participate in via interactions with the computer, the plurality of activities include one or more of the following activities:
selecting a virtual location for the first toy to live, in the virtual world;
playing of virtual games;
virtually purchasing virtual homes and virtual furnishings;
using virtual currency to purchase items in the virtual world;
playing games with multiple toys connected to allow enhanced play by combining characteristics of each toy;
virtually purchasing virtual food for a virtual avatar having similar attributes as said first toy using the virtual currency;
virtually feeding the virtual avatar;
playing with the virtual avatar;
playing with the virtual avatar along with additional users in the virtual world who are represented as virtual toys; or
communicating with the additional users using the computer to communicate to others in the virtual world; and
wherein the plurality of activities can be performed by linking two or more toys together to create a group of toys for such activities.

2. The apparatus of claim 1, wherein data from a virtual world is served to the computer through a browser application being executed on the computer and capable of displaying a web page using html when the first toy is connected to the computer.

3. The apparatus of claim 2, wherein a communication network between said first toy and said virtual world is the Internet.

4. The apparatus of claim 1, wherein the plurality of activities are selected from the group consisting of: game play, content creation, virtual role playing, virtual currency acquisition, virtual home and furniture purchase, virtual travel, and virtual commerce via a virtual store for selling virtual content created.

5. The apparatus of claim 1, wherein the plurality of activities include playing with a virtual avatar having similar attributes as the first toy along with additional virtual avatars registered by other users in the virtual world, and interacting with other users for game play and virtual social activities.

6. The apparatus of claim 5, wherein the additional virtual avatars represent additional toys registered by the other users.

7. The apparatus of claim 5, wherein the virtual avatar of the first toy virtually participates in one or more of the activities in the virtual world via the connected node or dongle.

8. The apparatus of claim 7 wherein the plurality of activities includes choosing a virtual location in the virtual world in which the virtual avatar of the first toy would live.

9. The apparatus of claim 1, wherein the plurality of activities include multiple toy game play by connecting two or more toys for combined characteristics and combined traits for grouped play.

10. The apparatus of claim 1, wherein the plurality of activities include virtually purchasing virtual furnishings for a virtual home in the virtual world using virtual currency.

11. The apparatus of claim 10, wherein the plurality of activities include virtually furnishing the virtual home in the virtual world using the virtual furnishings.

12. The apparatus of claim 1, wherein the plurality of activities includes caring for and maintaining the avatar of the first toy.

13. The apparatus of claim 1, wherein said first toy has preprogrammed characteristics loaded into the memory of the first toy.

14. The apparatus of claim 1 where the node or dongle can be attached to the USB connection located at the end of the appendage.

15. The apparatus of claim 14 where the node or dongle is electronically activated and the code can be read when connected to the USB appendage connection and another appendage USB port connection is connected to the computer.

16. The apparatus of claim 15 where the code registers with a web location when the first toy is connected to the computer and the computer is connected to the internet.

17. The apparatus of claim 16 wherein the first toy when connected to the computer allows access to special virtual locations, rooms, events or promotions inside the virtual world.

18. The apparatus of claim 17 where said node or dongle is purchased separately by a user of the first toy at retail locations or distributed as a promotional accessory.

19. The apparatus of claim 1, wherein the electronic code is activated when the node or dongle is connected to the first toy and the first toy is connected to the computer.

20. The apparatus as in claim 1 where the first toy receives electrical current when plugged into the computer.

21. The apparatus of claim 1, wherein the first toy has a plush exterior.

22. The apparatus of claim 1, wherein the first toy has a connector; and the node or dongle is removably connected to the connector.

23. The apparatus of claim 1, wherein the first toy has a connector adapted to connect to the computer.

24. The apparatus of claim 1, wherein the toy has a connector adapted to connect to the internet.

25. The apparatus of claim 1, wherein the first toy has a first virtual characteristic;
the second toy has a second different virtual characteristic; and
the first toy is connectable to the second toy so that the first and second virtual characteristics are combined in the virtual world.

* * * * *